US010288732B2

(12) United States Patent
Morita et al.

(10) Patent No.: US 10,288,732 B2
(45) Date of Patent: May 14, 2019

(54) DETECTION DEVICE, DETECTION METHOD, AND DETECTION PROGRAM

(71) Applicant: Panasonic Intellectual Property Management Co., Ltd., Osaka (JP)

(72) Inventors: Tadashi Morita, Kanagawa (JP); Masahiko Hashimoto, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/707,459

(22) Filed: Sep. 18, 2017

(65) Prior Publication Data

US 2018/0088231 A1    Mar. 29, 2018

(30) Foreign Application Priority Data

Sep. 29, 2016   (JP) ................. 2016-191683

(51) Int. Cl.
*G01S 15/58*   (2006.01)
*G01S 7/539*   (2006.01)
(Continued)

(52) U.S. Cl.
CPC ............ *G01S 15/582* (2013.01); *G01S 7/415* (2013.01); *G01S 7/539* (2013.01); *G01S 13/04* (2013.01); *G01S 13/325* (2013.01); *G01S 13/584* (2013.01); *G01S 15/04* (2013.01); *G01S 15/104* (2013.01); *G01S 15/325* (2013.01);
(Continued)

(58) Field of Classification Search
CPC ....... H04B 17/27; H04B 1/709; G01S 13/288;
G01S 13/36; G01S 13/505; G01S 13/34;
G01S 15/04; G01S 2007/358; G01S
15/582; G01S 13/325; G01S 15/325;
G01S 15/104; G01S 13/584; G01S 13/04;
G01S 7/415; G01S 15/931; G01S 7/539;
(Continued)

(56) References Cited

U.S. PATENT DOCUMENTS

2012/0176864 A1   7/2012  Karl
2012/0314541 A1  12/2012  Matsuura et al.
(Continued)

FOREIGN PATENT DOCUMENTS

JP   2012-533741 A   12/2012
JP   2014-206430 A   10/2014

OTHER PUBLICATIONS

The Extended European Search Report dated Feb. 26, 2018 for the related European Patent Application No. 17191772.7.

*Primary Examiner* — Vineeta S Panwalkar
(74) *Attorney, Agent, or Firm* — Seed IP Law Group LLP

(57) ABSTRACT

A detection device includes: a first correlation circuit that computes correlation of a first wave detection signal, which is a phase-modulated input wave detected at determined frequency, with a determined code sequence for every code composing the determined code sequence, and to generate first correlation signals the number of which corresponds to a code sequence length, which is a length of the determined code sequence; and a control circuit that rotates phases of the first correlation signals, generates an added value by adding the phase-rotated first correlation signals, and determines based on the added value whether the phase-modulated input wave is a return wave from a determined object.

16 Claims, 12 Drawing Sheets

(51) Int. Cl.
*G01S 15/93* (2006.01)
*G01S 7/41* (2006.01)
*G01S 13/04* (2006.01)
*G01S 13/32* (2006.01)
*G01S 13/58* (2006.01)
*G01S 15/04* (2006.01)
*G01S 15/10* (2006.01)
*G01S 15/32* (2006.01)
G01S 7/527 (2006.01)
G01S 15/52 (2006.01)
G01S 13/93 (2006.01)
G01S 7/35 (2006.01)

(52) U.S. Cl.
CPC ........... *G01S 15/931* (2013.01); *G01S 7/5276* (2013.01); *G01S 15/52* (2013.01); *G01S 2007/358* (2013.01); *G01S 2013/9346* (2013.01); *G01S 2013/9364* (2013.01); *G01S 2013/9367* (2013.01)

(58) Field of Classification Search
CPC ........... G01S 2013/9346; G01S 7/5276; G01S 15/52; G01S 2013/9364; G01S 2013/9367
See application file for complete search history.

(56) References Cited

U.S. PATENT DOCUMENTS

2015/0309167 A1* 10/2015 Shikatani ................ G01S 13/56
342/27
2016/0157828 A1* 6/2016 Sumi .................. G01N 29/0654
702/189

\* cited by examiner

- CARRIER WAVE FREQUENCY: fc(e.g. 56 kHz)
- CODE SEQUENCE: 10101010

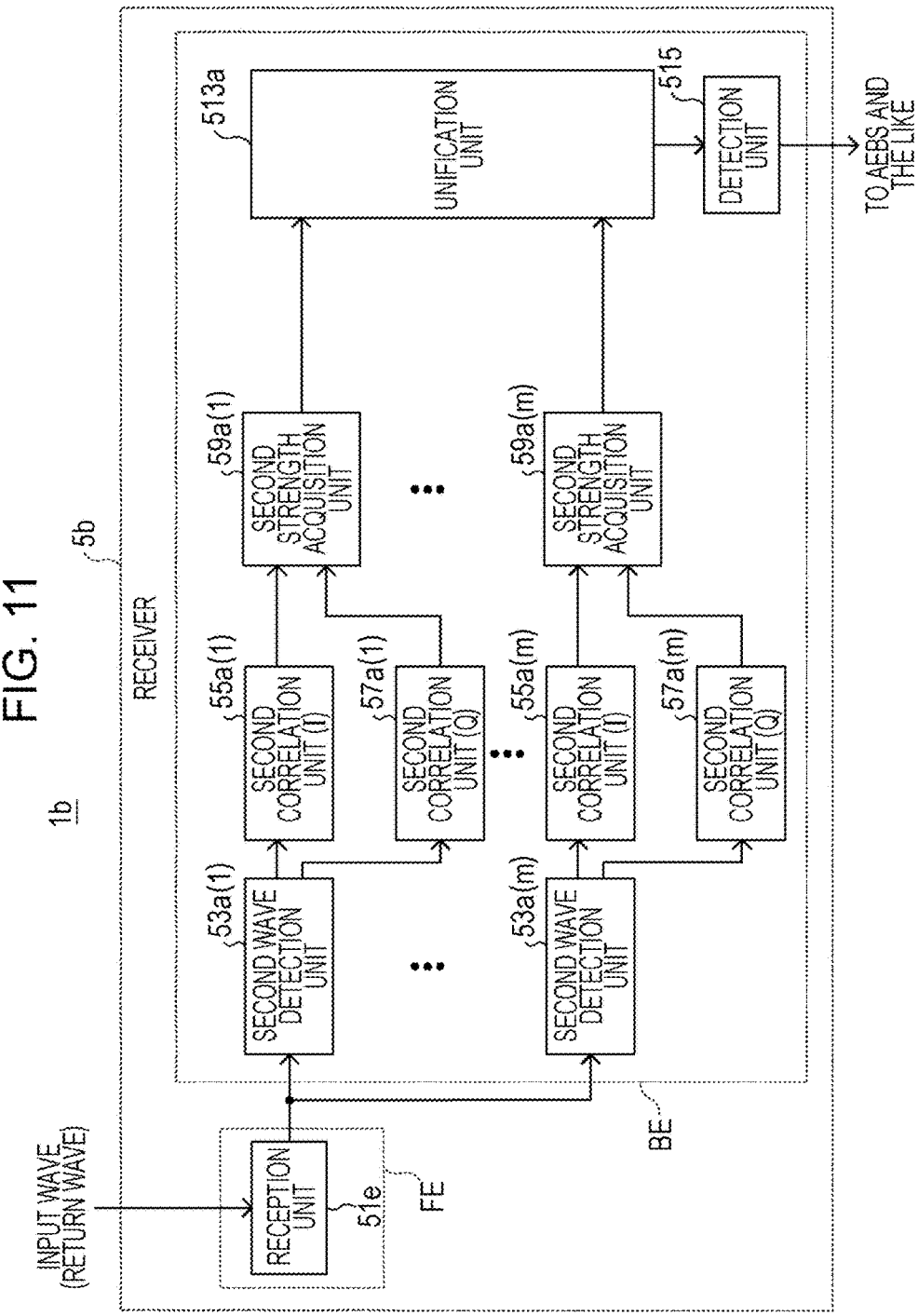

US 10,288,732 B2

DETECTION DEVICE, DETECTION METHOD, AND DETECTION PROGRAM

BACKGROUND

1. Technical Field

The present disclosure relates to a detection device, a detection method, and a detection program, which detect a surrounding object (target).

2. Description of the Related Art

A radar system described in Japanese Unexamined Patent Application Publication No. 2014-206430 has been known as the above type of detection device, for example. In this radar system, a radar receiver detects timing of receiving an encoded pulse signal based on a correlation result of the encoded pulse signal and a reference signal and then outputs the information on the timing of receiving the encoded pulse signal as a trigger for sampling a radar pulse signal. After outputting the trigger for sampling the radar pulse signal, the radar receiver starts sampling the radar pulse signal.

SUMMARY

In the conventional detection device, however, when the target is moving relative to the detection device, the Doppler shift may cause a phase rotation in the received encoded pulse signal. In this case, it is difficult for the detection device to correctly make the correlation of the received encoded pulse signal with the reference signal based on the code used in a radar transmitter. That is, it is difficult for the detection device to correctly detect the target moving relative to the detection device. Hereinafter, a target that moves relative to the detection device is called a moving target, and a target that has no speed relative to the detection device is called a static target.

One non-limiting and exemplary embodiment facilitates providing a detection device, a detection method, and a non-transitory computer-readable recording medium storing a detection program with improved accuracy of detecting a moving target.

In one general aspect, the techniques disclosed here feature a detection device, including: a first correlation circuit that makes correlation of a first wave detection signal which is a phase-modulated input wave detected at determined frequency with a determined code sequence for every code composing the determined code sequence, and to generate first correlation signals the number of which corresponds to a code sequence length, which is a length of the determined code sequence; and a control circuit that rotates phases of the first correlation signals, generates an added value by adding the phase-rotated signals the number of which corresponds to the code sequence length, and determines based on the added value whether the phase-modulated input wave is a return wave from a determined object.

According to the present disclosure, a detection device, a detection method, and a non-transitory computer-readable recording medium storing a detection program with improved accuracy of detecting a moving target are provided.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11 is a diagram showing a configuration of a detection system according to a second modification.

DETAILED DESCRIPTION

1. Detection System 1e

First of all, a detection system 1e is described with reference to FIG. 1.

Figure 1:
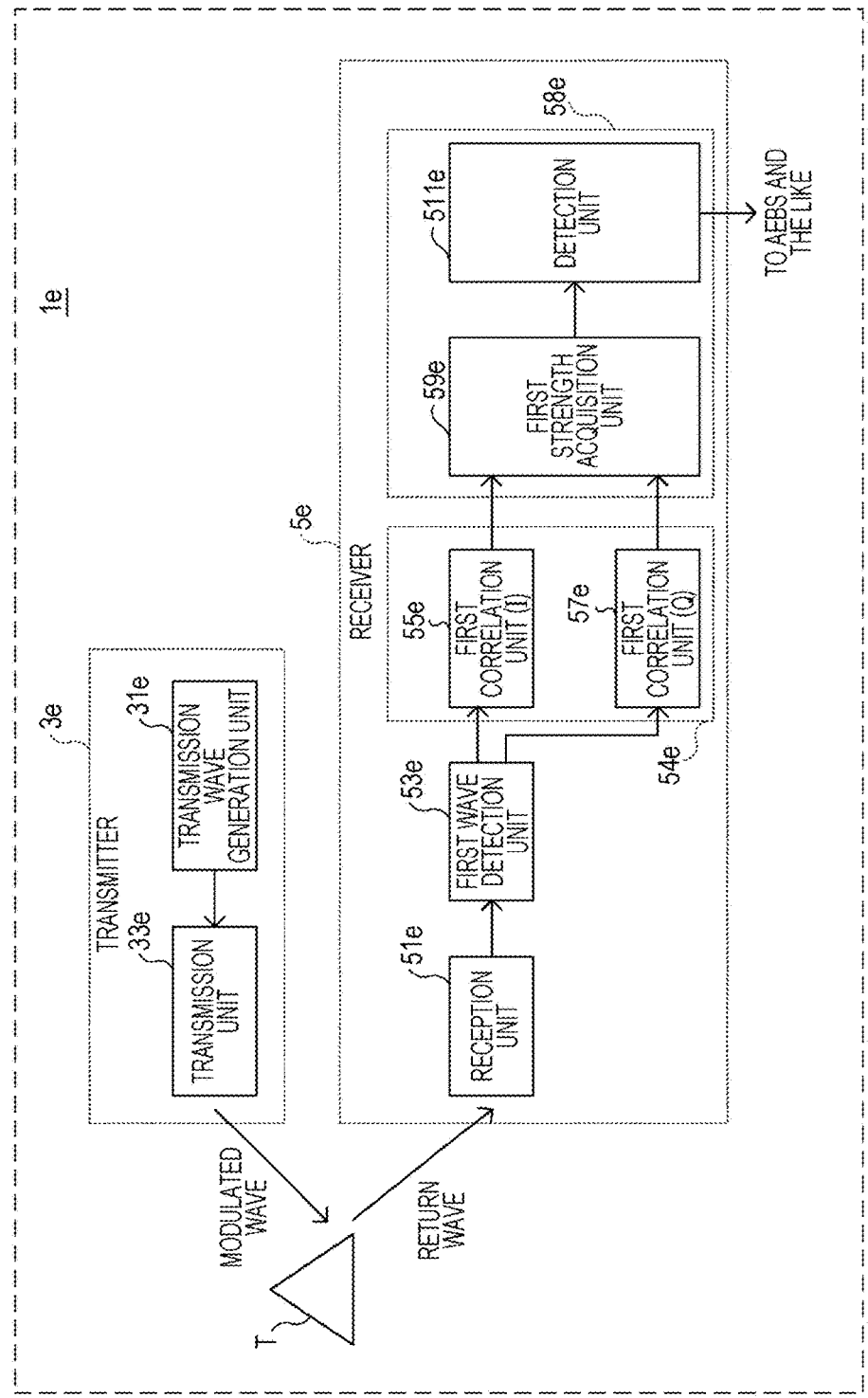
FIG. 1 is a diagram showing a configuration of a detection system according to a comparative example.

In FIG. 1, the detection system 1e is a device such as a sonar device for vehicles which includes a transmitter 3e and a receiver 5e. The transmitter 3e includes a transmission wave generation unit 31e and a transmission unit 33e. The receiver 5e includes a reception unit 51e, a first wave detection unit 53e, a first correlation unit (I) 55e, a first correlation unit (Q) 57e, a first strength acquisition unit 59e, and a detection unit 511e. Note that a first correlation unit 54e includes the first correlation unit (I) 55e and the first correlation unit (Q) 57e. A control unit 58e includes the first strength acquisition unit 59e and the detection unit 511e.

In the transmitter 3e, the transmission wave generation unit 31e modulates a carrier wave of frequency fc according to a determined encoding method (e.g., determined digital modulation method) using a known code sequence, thereby generating a modulated wave.

Figure 2:
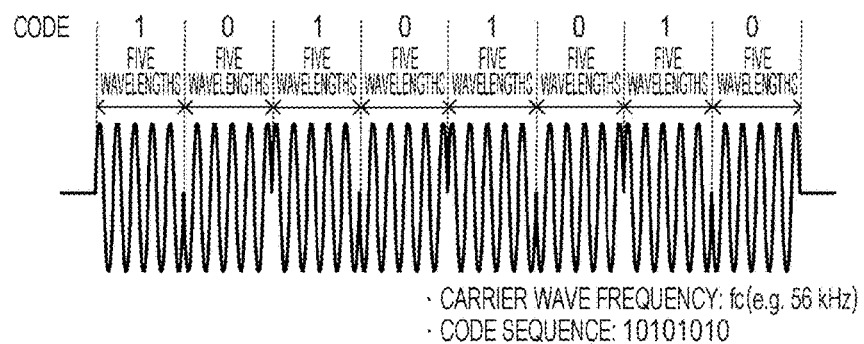
FIG. 2 is a diagram showing a modulated wave emitted from a transmitter in FIG. 1.

Next, an example of modulation in the transmission wave generation unit 31e is described with reference to FIG. 2. In FIG. 2, when the detection system 1e is a sonar device, the carrier wave frequency fc is set to 56 kHz, for example.

Phase shift keying such as binary phase shift keying (BPSK) is used for describing a determined encoding, for example. In the BPSK, a phase of the carrier wave is changed to either 0° or 180° by a determined number of wavelengths. The determined number is five, for example. When a code "0" is allocated to a phase 0°, a code "1" is allocated to a phase 180°.

In FIG. 2, the known code sequence is "1, 0, 1, 0, 1, 0, 1, 0," for example.

In FIG. 1, the modulated wave is outputted from the transmission wave generation unit 31e to the transmission unit 33e. The transmission unit 33e firstly amplifies the inputted modulated wave and then transmits the amplified modulated wave to an external space, for example. The modulated wave to be transmitted to the external space may be either a pulse wave or a continuous wave.

When a target T is present within a detection area (field of view) of the detection system 1e, the transmitted modulated wave is reflected from the target T. Part of the reflected wave is received by the receiver 5e as a return wave. Regarding the target T in the descriptions below, note that the target T is called a static target T1 when it represents a target that is motionless, and is called a moving target T2 when it represents a target that is moving.

In the receiver 5e, the reception unit 51e amplifies the received input wave and outputs the amplified input wave to the first wave detection unit 53e. The input wave may also be another unnecessary wave (interference) other than the above-described return wave.

Figure 3:
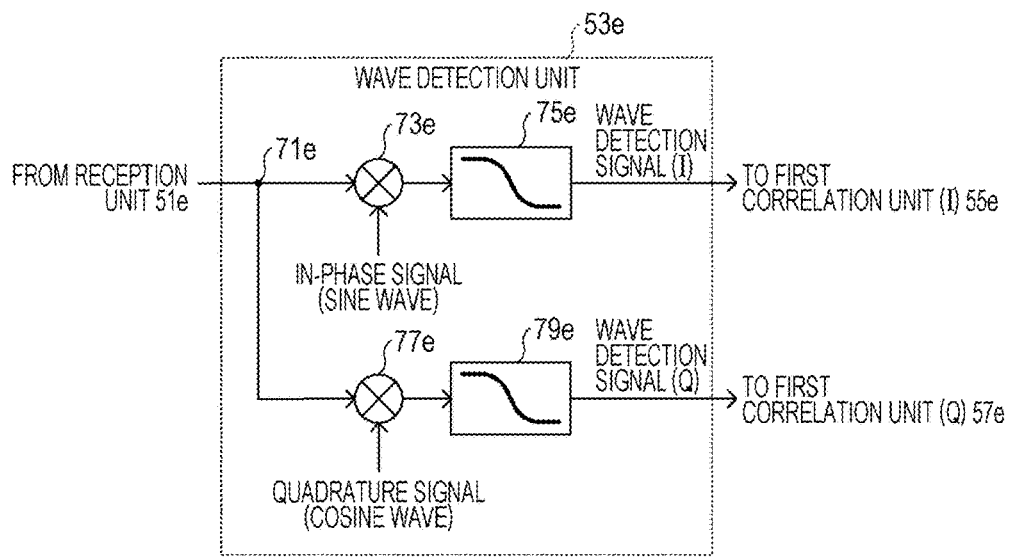
FIG. 3 is a diagram showing a configuration of a first wave detection unit in FIG. 1.

As shown in FIG. 3, the first wave detection unit 53e performs quadrature detection on the output wave from the reception unit 51e. The first wave detection unit 53e includes a branch section 71e, a first mixer (I) 73e, a first LPF (I) 75e, a second mixer (Q) 77e, and a second LPF (Q) 79e.

The output wave from the reception unit 51e is inputted to the branch section 71e. The branch section 71e separates the inputted wave in two and outputs one to the first mixer (I) 73e and the other to the second mixer (Q) 77e.

The one output wave from the branch section 71e and an in-phase signal of the frequency fc, which is synchronized with the phase of the carrier wave (e.g., sine wave), are inputted to the first mixer (I) 73e. The first mixer (I) 73e mixes the frequency of the output wave from the branch section 71e and of the in-phase signal, and outputs the mixed result to the first LPF (I) 75e in the following stage.

The first LPF (I) 75e removes a high-frequency component (e.g., frequency component of 2×fc) from the input signal from the first mixer (I) 73e and generates a wave detection signal (I). The frequency of the generated wave detection signal (I) is a difference between the frequency of the in-phase signal and the frequency of the input wave for the reception unit 51e. The first LPF (I) 75e outputs the generated wave detection signal (I) to the first correlation unit (I) 55e.

The another output wave from the branch section 71e and a quadrature signal of the frequency fc, which has a phase different from that of the in-phase signal by 90° (e.g., cosine wave), are inputted to the second mixer (Q) 77e. The second mixer (Q) 77e mixes the frequency of the output wave from the branch section 71e and of the quadrature signal, and outputs the mixed result to the second LPF (Q) 79e in the following stage.

The second LPF (Q) 79e removes the high-frequency component from the input signal from the second mixer (Q) 77e and generates a wave detection signal (Q). The second LPF (Q) 79e outputs the generated wave detection signal (Q) to the first correlation unit (Q) 57e in the following stage.

The first correlation unit 54e computes correlation of the first wave detection signal inputted from the first wave detection unit 53e with the known code sequence for every code, thereby generating first correlation signals the number of which corresponds to the later-described code sequence length. Since the first wave detection signal in the present disclosure includes the first wave detection signal (I) and the first wave detection signal (Q), which are separated by 90° from each other, the first correlation unit 54e has the first correlation unit (I) 55e and the first correlation unit (Q) 57e.

Figure 4:
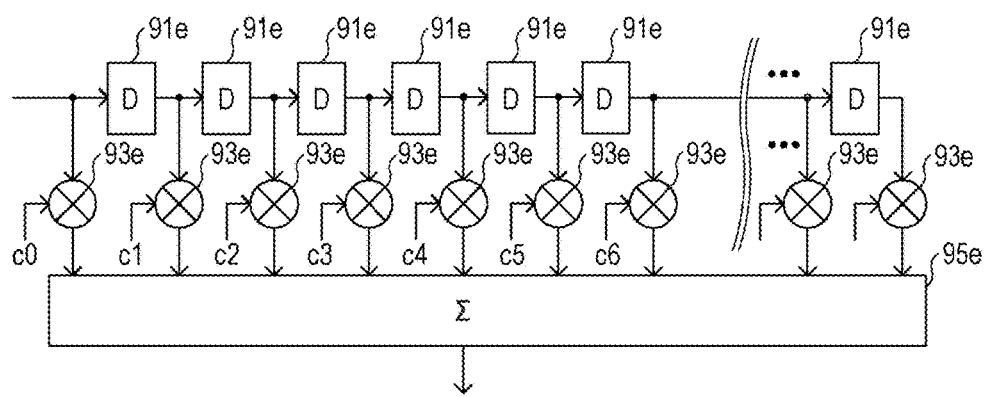
FIG. 4 is a diagram showing a configuration of each correlation unit in FIG. 1.

For example, the first correlation unit (I) 55e is shown in FIG. 4 as a matched filter that includes delay sections 91e, multiplication sections 93e, and an addition section 95e and computes correlation of the wave detection signal (I) inputted from the first mixer (I) 73e with the above-described known code sequence in every sampling cycle (e.g., clock cycle).

The coefficients used in the multiplication sections 93e are determined based on the codes composing the known code sequence. When the code sequence is like the one shown in FIG. 2, "1, 0, 1, 0, 1, 0, 1, 0," the code "0" is replaced by "−1," and the multiplication section 93e superimposes a code sequence "1, −1, 1, −1, 1, −1, 1, −1" on the modulated wave emitted from the transmission unit 33e. In this case, the coefficients used in the multiplication sections 93e are "1, −1, 1, −1, 1, −1, 1, −1."

Here, the number of taps allocated to each code is determined based on the modulated wave emitted from the transmission unit 33e and a sampling rate in the first correlation unit (I) 55e. When each code is allocated to every five wavelengths of the modulated wave as shown in FIG. 2, the number of taps is determined based on the number of times of sampling performed within a time of receiving the five wavelengths. A corresponding coefficient is set in the multiplication section 93e of the tap for each code.

Next, an example of the coefficients set in the multiplication sections 93e is described.

For example, when sampling is performed five times within the time of receiving the modulated wave of five wavelengths, five taps are allocated to each code. The coefficients of the multiplication sections 93e in this case are shown in Table 1 below.

TABLE 1

Coefficients of Multiplication Sections 93e

| Coefficient | Value |
|---|---|
| $c_0$ | +1 |
| $c_1$ | +1 |
| $c_2$ | +1 |
| $c_3$ | +1 |
| $c_4$ | +1 |
| $c_5$ | −1 |
| $c_6$ | −1 |
| $c_7$ | −1 |
| $c_8$ | −1 |
| $c_9$ | −1 |
| $c_{10}$ | +1 |
| $c_{11}$ | +1 |
| . | . |
| . | . |
| . | . |

In the above Table 1, the coefficient $c_0$ is a coefficient of a multiplication section 93e that is the closest to an input port of the first correlation unit (I) 55e. The coefficient $c_1$ is a coefficient of a multiplication section 93e that is the second-closest to the input port. Subsequently, a coefficient $c_i$ is a coefficient of a multiplication section 93e that is i+1th-closest to the input port; note that i is an integer.

Each multiplication section 93e multiplies the wave detection signal (I) inputted from the delay section 91e in the preceding stage by a coefficient corresponding to the value of the inputted wave detection signal (I), thereby generating a multiplied signal. Each multiplication section 93e outputs the generated multiplied signal to the addition section 95e.

The addition section 95e adds all the outputs from the multiplication sections 93e, thereby generating a correlation signal (I), which indicates how much the wave detection signal (I) and the known code sequence correlate with each other. The addition section 95e outputs the generated correlation signal (I) to the first strength acquisition unit 59e.

When the input wave for the receiver 5e has the same signal as that of the modulated wave emitted from the transmitter 3e, a correlation gain is obtained in the first correlation unit (I) 55e, whereby the correlation signal (I) has a large sharp correlation peak greater than or equal to a threshold level. In contrast, when the first correlation unit (I) 55e computes correlation with a time lag or computes correlation of the wave detection signal (I) with the known code sequence while a different code sequence is superimposed on the wave detection signal (I), the correlation peak greater than or equal to the threshold level does not occur in the correlation signal (I) to be outputted.

The first correlation unit (Q) 57e has the same configuration as the first correlation unit (I) 55e; however, the first correlation unit (Q) 57e differs from the first correlation unit (I) 55e in that the first correlation unit (Q) 57e outputs a correlation signal (Q), which indicates how much a wave detection signal (Q) and the known code sequence correlate with each other, to the first strength acquisition unit 59e. The first correlation unit (Q) 57e may not be described below.

In FIG. 1, based on the correlation signal (I) and the correlation signal (Q), the first strength acquisition unit 59e calculates an absolute value (signal strength of received return signal) in a quadrature space (phase plane in which I-axis (real number) is in-phase component of phase, and Q-axis (imaginary number) is quadrature component of phase) as an example of the strength information, thereby outputting the calculated result to the detection unit 511e in the following stage.

The detection unit 511e determines whether the strength information received from the first strength acquisition unit 59e is greater than a determined threshold. When the strength information is greater than or equal to the threshold, the detection unit 511e determines that the input wave for the reception unit 51e is the return wave from the target T, thereby judging that the target T is present within the detection area of the detection system 1e. On the other hand, when the strength information is less than the threshold, the detection unit 511e judges that there is no target T within the detection area.

The detection system 1e detects presence of the target T as described above. The determination result in the detection unit 511e is outputted to the advanced emergency braking system (AEBS) mounted in the vehicle. Based on the received determination result, the AEBS notifies of the presence of the target T by displaying on a display device equipped in the vehicle or by outputting a sound from a sound output device. The AEBS also automatically operates a brake of the vehicle when necessary.

When the above-described code sequence is a unique value of the vehicle, and the receiver 5e receives a modulated wave from another detection device, the large correlation peak greater than or equal to the threshold does not occur in the output signals from the first correlation unit (I) 55e and the first correlation unit (Q) 57e. Hence, the detection system 1e can prevent an error of detecting the target T.

2. Doppler Shift

Next, when the target T is moving relative to the detection system 1e, the Doppler effect causes the frequency of the return wave received by the receiver 5e to be different from the frequency of the modulated wave transmitted from the transmitter 3e.

When the target T is coming toward the receiver 5e, the Doppler effect causes the wavelength of the return wave to become shorter than that of the modulate wave, whereby the frequency of the return wave becomes greater than that of the modulated wave.

On the other hand, when the target T is moving away from the receiver 5e, the frequency of the return wave becomes smaller than that of the modulated wave because the wavelength of the return wave becomes longer than that of the modulate wave.

If the detection system 1e is the sonar device for vehicles, the carrier wave is a sound wave. The speed of sound in a space is about 340 m/s. Assuming that the target T is another vehicle that drives at 10 km/h (about 2.8 m/s). In this case, the percentage of the moving speed of the target relative to the propagation speed of the carrier wave in the space is less than 1%.

As described above, when the carrier wave frequency fc is 56 kHz and the moving speed of the target T is 10 km/h, the frequency of the return wave is obtained from the expressions (1) and (2) below:

1. When the target T is coming $$56 \times \frac{340 + 2.8}{340 - 2.8} = 56.93 \text{(kHz)};  \quad (1)$$

2. When the target T is moving away $$56 \times \frac{340 - 2.8}{340 + 2.8} = 55.09 \text{(kHz)}. \quad (2)$$

As described above, even though the percentage of the moving speed of the target relative to the propagation speed of the carrier wave in the space is less than 1%, the frequency of the return wave varies about ±1 kHz relative to the carrier wave frequency fc.

3. Technological Considerations of Detection System 1e

When the quadrature detection is performed on the return wave from the moving target T, a frequency component due to the Doppler shift remains in the output of the wave detection.

For example, as described above, when the carrier wave frequency fc is 56 kHz and the target T is coming toward the detection system 1e at 10 km/h, each of the wave detection signals (I) and (Q) has the frequency component of 0.93 kHz. More specifically, each of the wave detection signals (I) and (Q) is a signal in which a phase component corresponding to the code (0° or 180°) is superimposed on the wave of the frequency of 0.93 kHz.

When the first wave detection unit 53e performs the quadrature detection on the return wave from the static target T, the wave detection signals (I) and (Q) may have the phase component corresponding to the code (0° or 180°) but no frequency component due to the Doppler shift. When the wave detection signals (I) and (Q) have no frequency component due to the Doppler shift like this case, the correlation units 55e and 57e can perform the correlation processing properly on the wave detection signals (I) and (Q).

However, when the frequency component due to the Doppler shift remains in the wave detection signals (I) and (Q), a phase rotation is occurred, whereby the correlation units 55e and 57e may not perform the correlation processing properly. As a result, no correlation peaks may occur in the wave detection signals (I) and (Q). As described above, it is difficult for the detection system 1e to correctly detect the moving target T2.

4. Detection System 1 According to Present Disclosure

Figure 5:
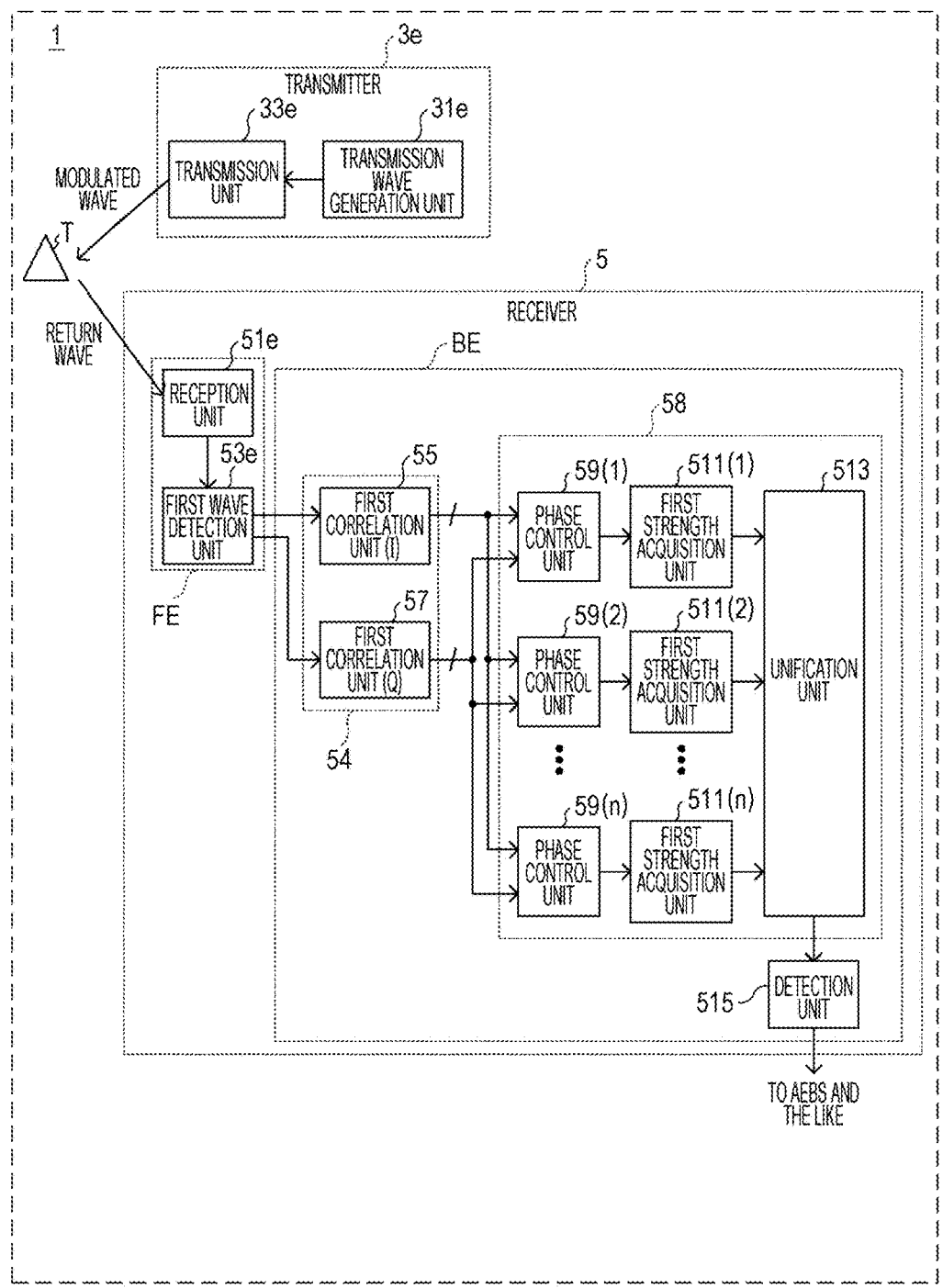
FIG. 5 is a diagram showing a configuration of a detection device according to one embodiment of the present disclosure.

Next, a detection system 1 according to one embodiment of the present disclosure is described with reference to FIGS. 5 to 7. In FIG. 5, the detection system 1 differs from the above-described detection system 1e in that the detection system 1 includes a receiver 5 instead of the receiver 5e. Note that the receiver 5 is a detection device for detecting a surrounding object (target).

The receiver 5 differs from the receiver 5e in that the receiver 5 includes a first correlation unit (I) 55, a first correlation unit (Q) 57, n sets of phase control units 59(j), strength acquisition units 511(j), a unification unit 513, and a detection unit 515 instead of the first correlation unit (I) 55e, the first correlation unit (Q) 57e the first strength acquisition unit 59e and the detection unit 511e.

Note that a first correlation unit 54 includes the first correlation unit (I) 55 and the first correlation unit (Q) 57. A control unit 58 includes the n sets of phase control units 59(j), the strength acquisition units 511(j), the unification unit 513, and the detection unit 515. j is a natural number from 1 to n. n is any integer greater than or equal to 2, and is exemplified as 9 in the present disclosure.

In FIG. 5, the components corresponding to those in the configuration in FIG. 1 are denoted by the same reference signs, and the descriptions thereof are omitted.

Note that the reception unit 51e and the first wave detection unit 53e in the receiver 5 are inclusively called a front end FE. The front end FE is, for example, implemented by being integrated in a radio frequency integrated circuit (RFIC) in a chip.

In contrast, the first correlation unit 54 and the control unit 58 are inclusively called a back end BE. The components of the back end BE are integrated in a digital signal processor (DSP) in a chip, for example.

The known code sequence has a length (hereinafter called code sequence length) of 15 as an example in the present disclosure; however the code sequence length can be any length.

Next, the first correlation unit 54 computes correlation of the first wave detection signal inputted from the first wave detection unit 53e with the known code sequence for every code, thereby generating the first correlation signals the number of which corresponds to the above-described code sequence length. Since the first wave detection signal in the present disclosure includes the first wave detection signals (I) and (Q), which are separated by 90° from each other, the first correlation unit 54 includes the first correlation unit (I) 55 and the first correlation unit (Q) 57.

The configurations of the first correlation unit (I) 55 and the first correlation unit (Q) 57 are described.

Figure 6A:
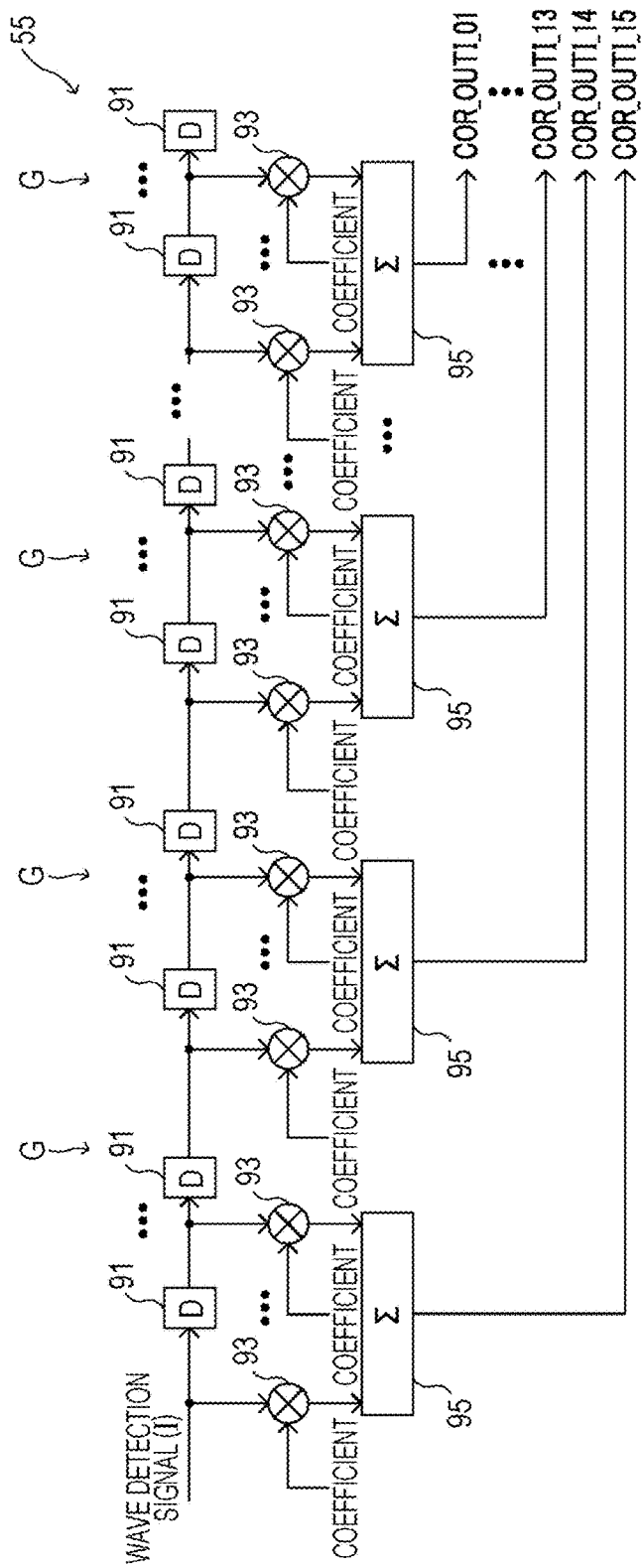
FIG. 6A is a diagram showing a configuration of a first correlation unit (I) in FIG. 5.

As shown in FIG. 6A, the first correlation unit (I) 55 has tap groups G the number of which corresponds to the above-described code sequence length. For example, one code is allocated to one tap group G. Each tap group G includes delay sections 91, multiplication sections 93, and an addition section 95.

The number of the delay sections 91 and the number of the multiplication sections 93 are determined based on the modulated wave emitted from the transmission unit 33e and the sampling rate in the first correlation unit (I) 55. When each code is allocated to every five wavelengths of the modulated wave as shown in FIG. 2, the number of the delay sections 91 and the number of the multiplication sections 93 are determined depending on the number of times of sampling performed by the first correlation unit (I) 55 within a time of receiving the five wavelengths. Corresponding coefficients are set in the multiplication sections 93 of each tap G.

The coefficients used in the multiplication sections 93 are determined in the same way as that for the coefficients used for the multiplication sections 93e. Each multiplication section 93 operates in a determined sampling rate, multiplies the wave detection signal (I) inputted from the delay section 91 in the immediately preceding stage by the set coefficient, and outputs the result as the multiplied value.

The addition sections 95 respectively add all the multiplied values from the corresponding multiplication sections 93 included in the same tap group G and output the results to the phase control unit 59(1) to the phase control unit 59(n) in the following stage.

Performing the above-described processing in the tap groups G the number of which corresponds to the above-described code sequence length, the first correlation unit (I) 55 of the present disclosure performs the processing of making correlation of the inputted wave detection signal (I) with the known code sequence for every code composing the known code sequence. As a result, unlike the addition section 95e, the added values outputted from the addition sections 95 generate the correlation signals (I) the number of which corresponds to the code sequence length.

Figure 6B:
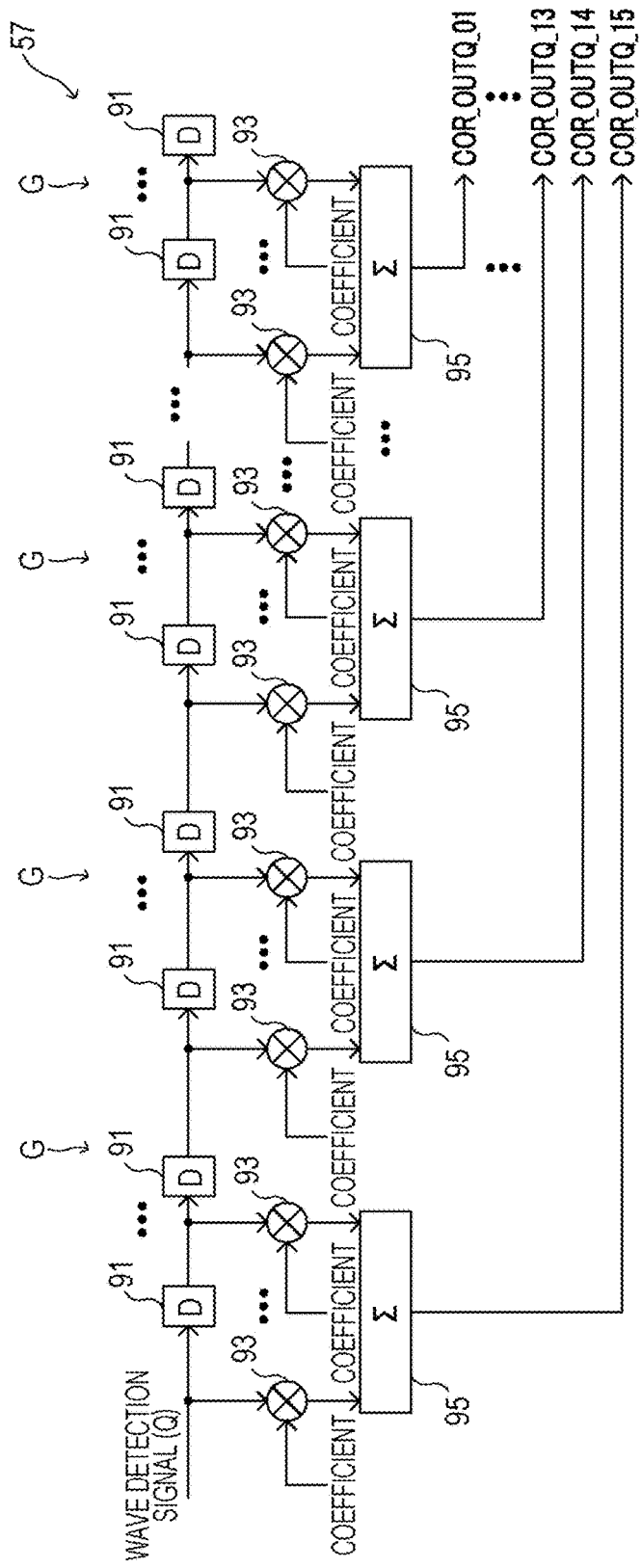
FIG. 6B is a diagram showing a configuration of a first correlation unit (Q) in FIG. 5.

The first correlation unit (Q) 57 has the same configuration as that of the first correlation unit (I) 55 as shown in FIG. 6B; however, the first correlation unit (Q) 57 differs from the first correlation unit (I) 55 in that the first correlation unit (Q) 57 performs processing on the wave detection signal (Q). The first correlation unit (Q) 57 may thus not be described below.

Since the same coefficients are allocated to the multiplication sections 93 included in the same tap group G, the multiplication sections 93 may perform processing after the addition section 95 perform its processing.

In the case of the 15 code sequence lengths, the first correlation unit (I) 55 outputs a total of 15 added values (correlation signals) (I), and the first correlation unit (Q) 57 also outputs a total of 15 added values (correlation signals) (Q). For the sake of convenience, each of the added values is named as those listed in Table 2 below.

TABLE 2

Names of Added Values Outputted from Addition Sections 95

| First Correlation Unit (I) 55 | | First Correlation Unit (Q) 57 | |
| --- | --- | --- | --- |
| Closeness from Input Port of Addition section 95 | Name | Closeness from Input Port of Addition section 95 | Name |
| Closest | COR_OUTI_15 | Closest | COR_OUTQ_15 |
| Second-Closest | COR_OUTI_14 | Second-Closest | COR_OUTQ_14 |
| Third-Closest | COR_OUTI_13 | Third-Closest | COR_OUTQ_13 |
| Fourth-Closest | COR_OUTI_12 | Fourth-Closest | COR_OUTQ_12 |

TABLE 2-continued

Names of Added Values Outputted from Addition Sections 95

| First Correlation Unit (I) 55 | | First Correlation Unit (Q) 57 | |
|---|---|---|---|
| Closeness from Input Port of Addition section 95 | Name | Closeness from Input Port of Addition section 95 | Name |
| Fifth-Closest | COR_OUTI_11 | Fifth-Closest | COR_OUTQ_11 |
| Sixth-Closest | COR_OUTI_10 | Sixth-Closest | COR_OUTQ_10 |
| Seventh-Closest | COR_OUTI_09 | Seventh-Closest | COR_OUTQ_09 |
| Eighth-Closest | COR_OUTI_08 | Eighth-Closest | COR_OUTQ_08 |
| Ninth-Closest | COR_OUTI_07 | Ninth-Closest | COR_OUTQ_07 |
| Tenth-Closest | COR_OUTI_06 | Tenth-Closest | COR_OUTQ_06 |
| Eleventh-Closest | COR_OUTI_05 | Eleventh-Closest | COR_OUTQ_05 |
| Twelfth-Closest | COR_OUTI_04 | Twelfth-Closest | COR_OUTQ_04 |
| Thirteenth-Closest | COR_OUTI_03 | Thirteenth-Closest | COR_OUTQ_03 |
| Fourteenth-Closest | COR_OUTI_02 | Fourteenth-Closest | COR_OUTQ_02 |
| Fifteenth-Closest | COR_OUTI_01 | Fifteenth-Closest | COR_OUTQ_01 |

In the above Table 2, the name of the added value outputted from the addition section 95 that is the closest to the input port of the first correlation unit (I) 55 is COR_OUTI_15, for example. The name of the added value outputted from the addition section 95 that is the farthest from the input port of the first correlation unit (Q) 57 is COR_OUTQ_01.

In FIG. 5, each of the n sets of phase control units 59(*j*) receives all the added values from the first correlation unit (I) 55 and all the added values from the first correlation unit (Q) 57. As shown in FIG. 7, each phase control unit 59(*j*) is provided with phase rotation operation sections 591(*j*) for every code of the code sequence. When the code sequence length is 15 as the present disclosure, 15 phase rotation operation sections $591(j)_1$ to $591(j)_{15}$ are provided. Each of the phase rotation operation sections $591(j)_1$ to $591(j)_{15}$ performs a phase rotation operation of a determined pattern on an added value with the corresponding code received from the first correlation unit (I) 55, and also performs the phase rotation operation of the determined pattern on an added value with the same code sequence number received from the first correlation unit (Q) 57.

Figure 7:
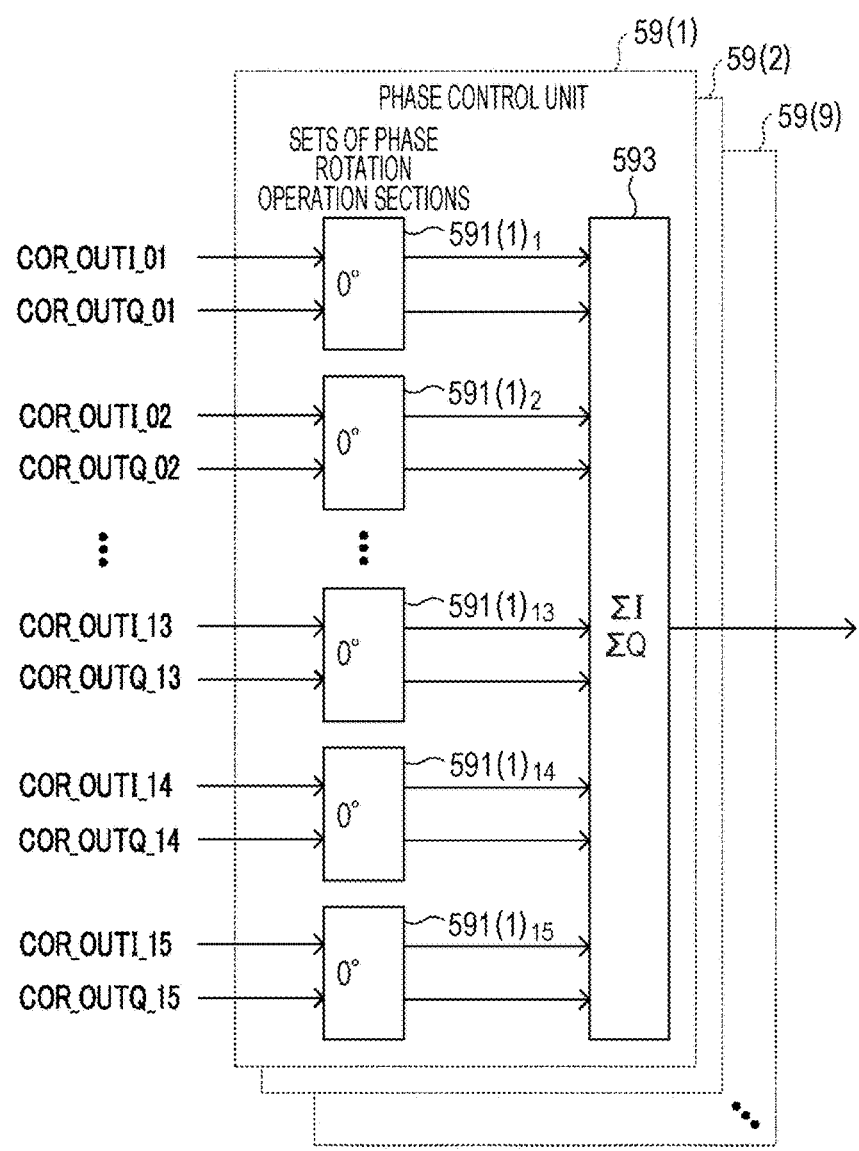
FIG. 7 is a diagram showing a configuration of phase control units in FIG. 5.

According to FIG. 7, in the phase control unit 59(1) the phase rotation operation section $591(1)_1$ performs a phase rotation operation of 0° on the outputted added value COR_OUTI_01 and the outputted added value COR_OUTQ_01. In addition, the phase rotation operation section $591(1)_2$ performs the phase rotation operation of 0° on the outputted added value COR_OUTI_02 and the outputted added value COR_OUTQ_02. FIG. 7 exemplifies that the phase rotation operation sections $591(1)_{13}$ to $591(1)_{15}$ perform the same phase rotation operation.

The phase rotation operation is described below.

First, the different moving speeds v(1) to v(n) of the target T are allocated to the phase control units 59(1) to 59(*n*). As described above, n is 9. n and the moving speeds v(1) to v(n) are properly determined by a programmer of the back end BE. When the target T is a pedestrian, a corresponding moving speed v is determined as 4 km/h.

As described in the second unit, the amount of the Doppler shift in the return wave varies depending on the moving speed v(j) of the target T. Such an amount of the Doppler shift causes a phase rotation of an amount corresponding to the moving speed v(j) in the code sequence that is superimposed on the return wave. Hence, the amount of phase rotation occurred in each code, which composes the code sequence, depending on the moving speed v(j) is derived in advance by, for example, a test and a simulation in a programming stage of the detection system 1.

In order to compensate for phase rotations that may occur in the codes, the phase control units 59(*j*) perform the phase rotation operation on the added values outputted from the first correlation unit (I) 55 and the first correlation unit (Q) 57.

Here, the phase rotation amounts operated by the phase control units 59(*j*) are described with reference to the example in Table 3 below.

TABLE 3

Phase Rotation Amounts in Phase Control Units 59(1) to 59(9)

| | v(1) | v(2) | v(3) | v(4) | v(5) | v(6) | v(7) | v(8) | v(9) |
|---|---|---|---|---|---|---|---|---|---|
| Head Code | 0° | 0° | 180° | 0° | 0° | 0° | 180° | 0° | −90° |
| Second Code | 0° | 0° | 180° | 0° | 0° | 0° | 90° | 0° | −90° |
| Third Code | 0° | 0° | 180° | 0° | 0° | 0° | 90° | 0° | −90° |
| Fourth Code | 0° | 0° | 180° | 0° | −90° | 0° | 90° | 0° | 180° |
| Fifth Code | 0° | 0° | 180° | 0° | −90° | 0° | 90° | 90° | 180° |
| Sixth Code | 0° | 0° | 180° | 0° | −90° | 90° | 90° | 90° | 180° |
| Seventh Code | 0° | 0° | 180° | 0° | −90° | 90° | 0° | 90° | 180° |
| Eighth Code | 0° | 0° | 90° | 90° | −90° | 90° | 0° | 90° | 90° |
| Ninth Code | 0° | 0° | 90° | 90° | −90° | 90° | 0° | 180° | 90° |
| Tenth Code | 0° | 0° | 90° | 90° | −90° | 90° | 0° | 180° | 90° |
| Eleventh Code | 0° | 0° | 90° | 90° | 180° | 180° | 0° | 180° | 90° |
| Twelfth Code | 0° | 0° | 90° | 90° | 180° | 180° | −90° | 180° | 0° |
| Thirteenth Code | 0° | 90° | 90° | 90° | 180° | 180° | −90° | −90° | 0° |
| Fourteenth Code | 0° | 90° | 90° | 90° | 180° | 180° | −90° | −90° | 0° |
| Fifteenth Code | 0° | 90° | 90° | 180° | 180° | 180° | −90° | −90° | 0° |

According to the above Table 3, in the case of the moving speed v(1), the phase rotation operations of 0° are performed on all the outputted added values COR_OUTI_01 to COR_OUTI_15 and all the outputted added values COR_OUTQ_01 to COR_OUTQ_15.

In the case of the moving speed v(2), the phase rotation operations of 0° are performed on the outputted added values COR_OUTI_01 to COR_OUTI_12 and the outputted added values COR_OUTQ_01 to COR_OUTQ_12 while the phase rotation operations of 90° are performed on the outputted added values COR_OUTI_13 to COR_OUTI_15 and the outputted added values COR_OUTQ_13 to COR_OUTQ_15.

Also in the cases of the moving speeds v(3) to v(9), the phase rotation operations of the angles listed in the above Table 3 are performed in the same manner as the above on the outputted added values COR_OUTI_01 to COR_OUTI_15 and the outputted added values COR_OUTQ_01 to COR_OUTQ_15.

In the example in the above Table 3, the phase rotation amounts are allocated to each code to make approximate rotations by 90°; however, those in the above Table 3 are just an example for making the above-described phase rotation.

Next, the phase rotation operation for each phase rotation amount listed in the above Table 3 is described with reference to the example in Table 4 below.

TABLE 4

Phase Rotation Operation for Each Phase Rotation Amount

| | Phase Rotation Amount | | | |
|---|---|---|---|---|
| | 0° | 90° | 180° | −90° |
| I_OUT | I_IN | −Q_IN | −I_IN | Q_IN |
| Q_OUT | Q_IN | I_IN | −Q_IN | −I_IN |

In the above Table 4, I_IN is any of the outputted added values COR_OUTI_01 to COR_OUTI_15, and Q_IN is any of the outputted added values COR_OUTQ_01 to COR_OUTQ_15. I_OUT is any of the outputted added values COR_OUTI$_{13}$ 01 to COR_OUTI_15 on which the corresponding phase rotation operation section $591(j)$ already performs the operations, and Q_OUT is any of the outputted added values COR_OUTQ_01 to COR_OUTQ_15 on which the corresponding phase rotation operation section $591(j)$ already performs the operations.

When the phase rotation amount is 0°, the outputs I_OUT and Q_OUT of the phase rotation operation section $591(j)$ are I_OUT=I_IN and Q_OUT=Q_IN.

Even in the case of another phase rotation amount, the phase rotation operation section $591(j)$ performs the phase rotation operation according to the above Table 4.

Next, the phase rotation operation is described more specifically.

For example, the phase rotation operation of the phase control unit $59(8)$ is described with reference to the phase rotation amounts of the moving speed v(8) in the above Table 3.

In this case, each phase rotation amount of the head code to the fourth code in Table 3 is 0°. According to the above Table 4, when the phase rotation amount is 0°, the outputs I_OUT and Q_OUT of the phase rotation operation sections $591(8)_1$ to $591(8)_4$ are I_OUT=I_IN and Q_OUT=Q_IN.

Each phase rotation amount of the fifth code to the eighth code in Table 3 is 90°. In this case, the outputs I_OUT and Q_OUT of the phase rotation operation sections $591(8)_5$ to $591(8)_8$ are I_OUT=−Q_IN and Q_OUT=I_IN.

Each phase rotation amount of the ninth code to the twelfth code in Table 3 is 180°. In this case, the outputs I_OUT and Q_OUT of the phase rotation operation sections $591(8)_9$ to $591(8)_{12}$ are I_OUT=−I_IN and Q_OUT=−Q_IN.

Each phase rotation amount of the thirteenth code to the fifteenth code in Table 3 is −90° (=270°). In this case, the outputs I_OUT and Q_OUT of the phase rotation operation sections $591(8)_{13}$ to $591(8)_{15}$ are I_OUT=Q_IN and Q_OUT=−I_IN.

As shown in FIG. 7, each phase control unit $59(j)$ is provided with an addition section $593(j)$ in the following stage of the phase rotation control units $591(j)$. The addition section $593(j)$ generates an added value (I), which is obtained by adding the added values COR_OUTI_01 to COR_OUTI15 on which the phase rotation control unit $591(j)$ already performs the operations in the preceding stage, and an added value (Q), which is obtained by adding the added values COR_OUTQ_01 to COR_OUTQ15 on which the phase rotation control unit $591(j)$ already performs the operations.

The phase rotation operation of the phase control unit $59(8)$ has been described above. Other phase control units $59(j)$ perform the phase rotation operation on the codes in the same manner.

The above-described phase rotation operation approximately rotates the phase of each input signal for the phase control units $59(j)$ (i.e., the added values COR_OUTI_01 to COR_OUTI15 and the added values COR_OUTQ_01 to COR_OUTQI15) for the determined amount with the specific frequency component. This frequency component is determined depending on, for example, the phase rotation amount that should be applied to the input signal, the number of the taps allocated to each code, and the sampling rate.

For example, the phase control unit $59(8)$ applies a phase rotation of xHz to the input signal. In this case, the added value outputted from the phase control unit $59(8)$ is equivalent to the correlation signal, which is obtained by detecting the input wave using the in-phase signal of frequency of a combination of the carrier wave frequency fc and xHz, and by making correlation of the detected result with the known code sequence.

That is, regarding the n phase control units $59(1)$ to $59(n)$, applying the phase rotations corresponding to different frequency to the input signals and subsequently adding them is substantially equivalent to detecting the input wave using the n types of in-phase signal and making correlation of the detected input wave with the known code sequence.

Here, unlike the first correlation units (I) $55e$ and (Q) $57e$ in the comparative example, the first correlation unit (I) $55$ and the first correlation unit (Q) $57$ have no intermediate signal. Thus, substantially, the size of the circuits of the first correlation unit (I) $55$ and the first correlation unit (Q) $57$ do not become larger than those in the first correlation units (I) $55e$ and the first correlation unit (Q) $57e$.

According to the present disclosure, as can be seen in the above Table 4, the phase rotation operations performed by the phase rotation operation sections $591$ $(j)$ are just a replacement of the input signals (i.e., the added values COR_OUTI_01 to COR_OUTI15 and the added values COR_OUTQ_01 to COR_OUTQI15) and/or an inversion of the codes. Hence, adding the phase control units $59(j)$ does not affect that much on the size increase of the circuit in the front end FE.

Here, see FIG. 5 again. The sets of added values (I) and (Q) of the n phase control units 59(1) to 59(n) are inputted to the corresponding strength acquisition units 511(1) to 511(n). Based on the both correlation signals (I) and (Q), the strength acquisition units 511(1) to 511(n) calculate an absolute value in the quadrature space as the strength information indicating the signal strength of the input wave, and output the strength information to the unification unit 513 in the following stage.

Note that, based on the both correlation signals (I) and (Q), the strength acquisition units 511(1) to 511(n) may derive a power (electric power value) of the received return wave as the strength information.

The n pieces of strength information are inputted to the unification unit 513 in every sampling cycle. The unification unit 513 selects one with the greatest value from the n pieces of strength information that are inputted in the same sampling cycle. the unification unit 513 outputs the selected strength information and index information, which indicates the strength acquisition unit 511(j) that outputs the strength information, together to the detection unit 515.

The strength information and the index information are inputted to the detection unit 515 in every sampling cycle. The detection unit 515 determines whether the strength information obtained by the unification unit 513 is greater than the determined threshold. When the strength information is greater than or equal to the threshold, the detection unit 515 determines that the target T is present within the detection area of the detection system 1. In contrast, when the strength information is less than the threshold, the detection unit 515 determines that no target T is present within the detection area.

When the strength information is determined as greater than or equal to the threshold, the detection unit 515 outputs the inputted index information (i.e., relative speed) and the current time to, for example, the AEBS. In this case, based on the received index information, the AEBS notifies of the presence of the target T and the relative speed of the target T by displaying on the display device equipped in the vehicle or by outputting a sound from the sound output device. The AEBS also automatically operates the brake of the vehicle when necessary.

5. Conclusion of Embodiment

As described above, according to the back end BE of the present disclosure, the first correlation unit (I) 55 and the first correlation unit (Q) 57 perform processing of making correlation of the wave detection signals (I) and (Q) inputted from the first wave detection unit 53e with the known code sequence for every code, thereby generating the correlation signals (I) and (Q) the numbers of which each correspond to the code sequence length. Here, the first correlation unit (I) 55e and the first correlation unit (Q) 57e in the comparative example compute the correlation of the input wave detection signals (I) and (Q) with the known code sequence, thereby generating single correlation signals (I) and (Q) indicating how much the input wave detection signals (I) and (Q) and the known code sequence correlate with each other. While the first correlation unit (I) 55e and the first correlation unit (Q) 57e compute the correlation for every code, the first correlation unit (I) 55 and the first correlation unit (Q) 57 compute the correlation for every code sequence.

When the correlation signals (I) the number of which corresponds to the code sequence length are inputted, the n phase control units 59(j) generate the added values (I), which are obtained by rotating the phases of the inputted correlation signals (I) for the determined amount corresponding to the allocated frequency components and subsequently adding those phases.

Here, when the amount of phase rotation occurred in the code sequence of the input wave due to the Doppler shift is the same or similar to the amount of phase rotation allocated to one of the phase control units 59(j), the added values (I) and (Q) thereof shows the large correlation peaks greater than or equal to the threshold. The added values (I) and (Q) with the correlation peaks greater than or equal to the threshold are processed subsequently by the unification unit 513 and the detection unit 515, whereby the back end BE can improve accuracy of detecting the presence of the moving target T2 and the relative speed thereof.

Since the back end BE of the present disclosure is provided with the phase control unit 59(1) that does not perform the phase rotation operation, accuracy of detecting the presence of the static target T1 is also improved.

6. Additional Description of Present Embodiment

Figure 8A:
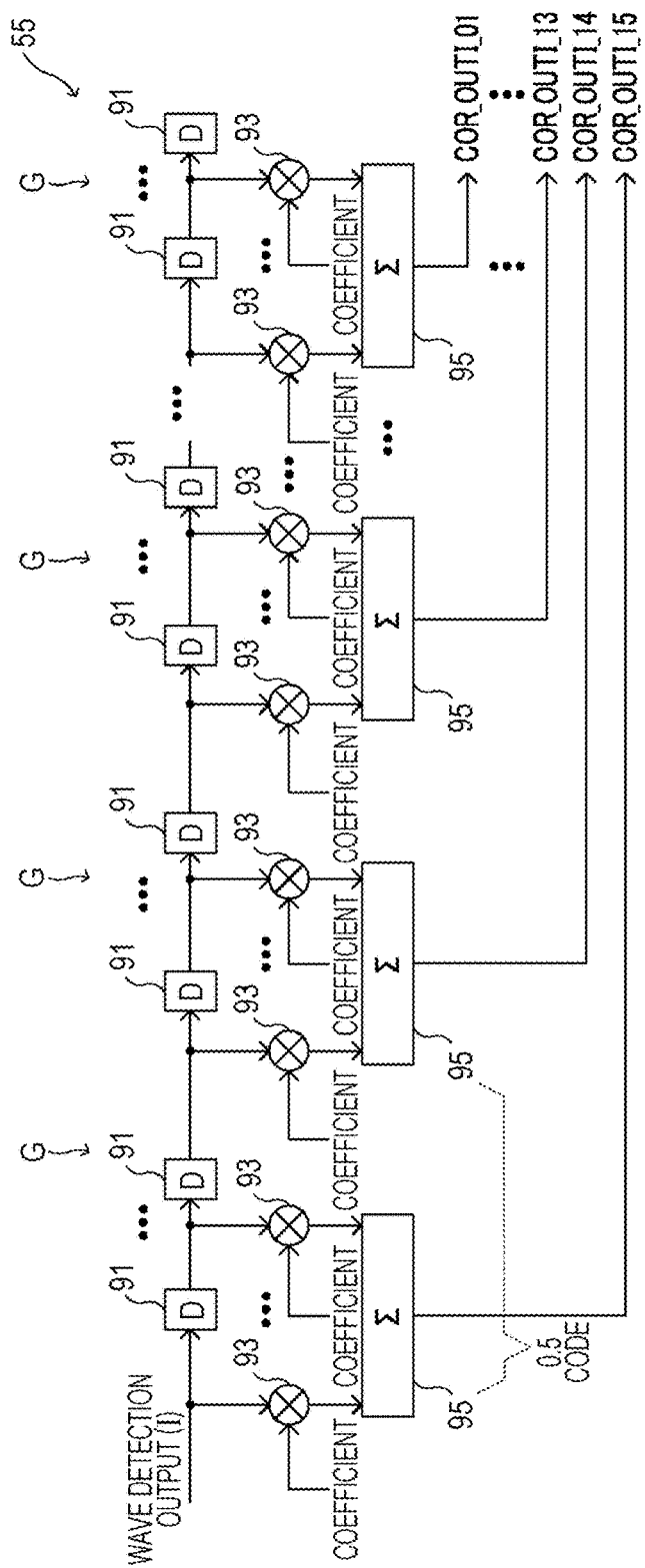
FIG. 8A is a diagram showing a configuration of the first correlation unit (I) in which 0.5 code is allocated to each tap group.
Figure 8B:
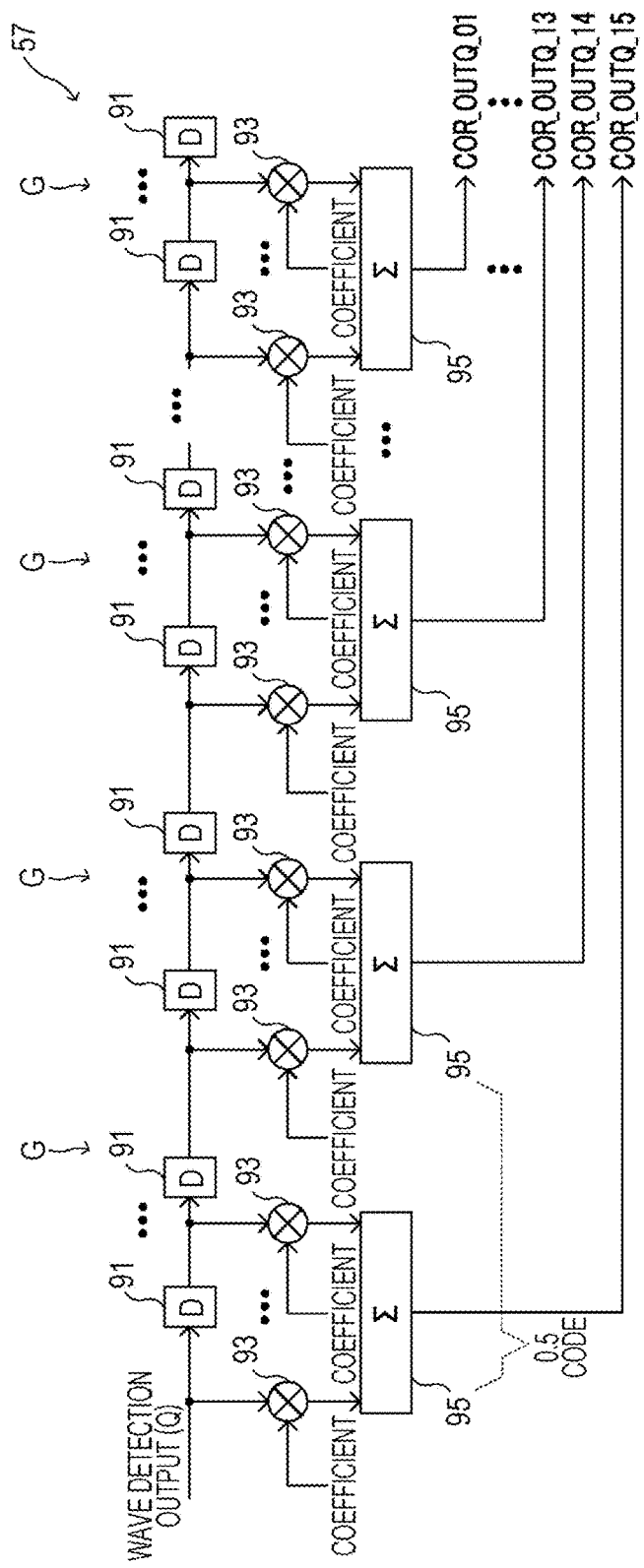
FIG. 8B is a diagram showing a configuration of the first correlation unit (Q) in which 0.5 code is allocated to each tap group.

In the above embodiment, one code is allocated to one tap group G in FIGS. 6A and 6B; however, it is not limited thereto. As shown in the first correlation unit (I) in FIG. 8A and the first correlation unit (Q) in FIG. 8B, less than one code (e.g., 0.5 code) may be allocated to one tap group G. This makes it possible to perform the phase rotation operation with higher accuracy than the above-described embodiment.

In the above-described embodiment, as can be seen in Table 3, the phase rotation operations in the phase control units 59(j) are performed by 90°; however, it is not limited thereto. The phase rotation operations may be performed by 90°/m (m is an integer greater than or equal to 2). Table 5 below exemplifies the phase rotation operations performed by 45° (in the case where m=2).

TABLE 5

Example of Other Phase Rotation Amounts

|  | v(1) | v(2) | ... |
|---|---|---|---|
| Head Code | 0° | 0° | ... |
| Second Code | 0° | 0° | ... |
| Third Code | 0° | 45° | ... |
| Fourth Code | 0° | 45° | ... |
| Fifth Code | 0° | 90° | ... |
| Sixth Code | 0° | 90° | ... |
| Seventh Code | 0° | 135° | ... |
| Eighth Code | 0° | 135° | ... |
| Ninth Code | 0° | 180° | ... |
| Tenth Code | 0° | 180° | ... |
| Eleventh Code | 0° | −135° | ... |
| Twelfth Code | 0° | −135° | ... |
| Thirteenth Code | 0° | −90° | ... |
| Fourteenth Code | 0° | −90° | ... |
| Fifteenth Code | 0° | −45° | ... |

A description is given for the phase rotation operations of the n phase rotation operation sections 591(j) listed in Table 6, which correspond to the above Table 5. Table 6 is not described since it can be understood in the same way as Table 4.

TABLE 6

Phase Rotation Operation in Every Phase Rotation Amount

| | Phase Rotation Amount | | | | |
|---|---|---|---|---|---|
| | 0° | 45° | 90° | 135° | 180° |
| I_OUT | I_IN | $\dfrac{\text{I\_IN} - \text{Q\_IN}}{\sqrt{2}}$ | −Q_IN | $\dfrac{-\text{I\_IN} - \text{Q\_IN}}{\sqrt{2}}$ | −I_IN |
| Q_OUT | Q_IN | $\dfrac{\text{I\_IN} + \text{Q\_IN}}{\sqrt{2}}$ | I_IN | $\dfrac{\text{I\_IN} + \text{Q\_IN}}{\sqrt{2}}$ | −Q_IN |

| | Phase Rotation Amount | | |
|---|---|---|---|
| | −135° | −90° | −45° |
| I_OUT | $\dfrac{-\text{I\_IN} + \text{Q\_IN}}{\sqrt{2}}$ | Q_IN | $\dfrac{\text{I\_IN} + \text{Q\_IN}}{\sqrt{2}}$ |
| Q_OUT | $\dfrac{-\text{I\_IN} - \text{Q\_IN}}{\sqrt{2}}$ | −I_IN | $\dfrac{-\text{I\_IN} + \text{Q\_IN}}{\sqrt{2}}$ |

When the phase rotation operation is performed by 90°/m (m is an integer greater than or equal to 2) as described above, the size of the circuit in the phase control unit 59(j) becomes larger than that in the above-described embodiment; however, the phase rotation operation can be performed with higher accuracy.

The phase control units 59 applies the phase rotation amounts to each code by 90°/m in the above description; however, the amounts may be different in each code.

For example, in the case of the phase control with two rotations for 15 codes, the phase rotation of (2×360°)/15=48° can be applied.

Further, in the case of the phase control with 1.5 rotations for 15 codes, the phase rotation of (1.5×360°)/15=36° can be applied.

Furthermore, one of the phase control units 59 can make the phase control by 48° while another one of the phase control units 59 make the phase control by 36°.

In the above-described embodiment, the relative speed of the moving target T2 that can be detected by the detection unit 515 has n variations as the maximum; however, if the unification unit 513 and the detection unit 515 perform the later-described processing, the relative speed of about 2×n variations can be detected. That is, the relative speed can be detected with much higher accuracy. Note that the later-described processing is also applicable to the later-described first modification and second modification.

For example, it is assumed that n=5 and the relative speed of the target T that is detected by a set of the phase control unit 59(1) and the strength acquisition unit 511(1) is 0 km/h.

Then, it is assumed that the relative speed of the target T that is detected by a set of the phase control unit 59(2) and the strength acquisition unit 511(2) is +2 km/h.

In addition, it is assumed that the relative speed of the target T that is detected by a set of the phase control unit 59(3) and the strength acquisition unit 511(3) is +4 km/h.

Then, it is assumed that the relative speed of the target T that is detected by a set of the phase control unit 59(4) and the strength acquisition unit 511(4) is +6 km/h.

Moreover, it is assumed that the relative speed of the target T that is detected by a set of the phase control unit 59(5) and the strength acquisition unit 511(5) is +8 km/h.

Note that the polarity (+) of the relative speed means that the target T is moving away from the receiver 5.

The unification unit 513 selects one with the greatest value from the n pieces of strength information inputted in the same sampling cycle. The unification unit 513 outputs the strength information indicating the greatest value (511(j)), a speed index corresponding to the relative speed thereof, the strength information with a value around the greatest value (511(j−1) and/or 511(j+1)), and a speed index corresponding to the relative speed thereof to the detection unit 515.

When the received two pieces of strength information are less than the threshold, the detection unit 515 refers to the relative speed from the index information of the strength information with the greatest strength. When the received two pieces of strength information are greater than or equal to the threshold, the detection unit 515 determines that the intermediate value of the relative speeds indicated by the corresponding two pieces of index information is the relative speed of the moving target T2.

The present disclosure describes the carrier wave as a sound wave; however, it is not limited thereto. The carrier wave may also be an electric wave or a light. This point is also applicable to the later-described first modification and the second modification.

The present disclosure exemplifies the BPSK as the encoding method; however, it is not limited thereto. PSK of the quadrature phase shift keying (QPSK) may also be employed as the encoding method.

The present disclosure describes that the first wave detection unit 53e performs the quadrature detection; however, it is not limited thereto. The first wave detection unit 53e may perform coherent detection (phase detection). In this case, the first correlation unit (Q) 57 can be removed.

In the backend BE, the phase control units 59(j), the strength acquisition units 511(j), the unification unit 513, and the detection unit 515 may be implemented as a computer program. The computer program may be provided by being stored in a distribution medium such as a DVD, or may be stored in a server device on a network so that the program can be downloaded via the network.

7. First Modification

Next, a detection system 1a according to the first modification of the above-described embodiment is described with reference to FIGS. 9 and 10.

Figure 9:
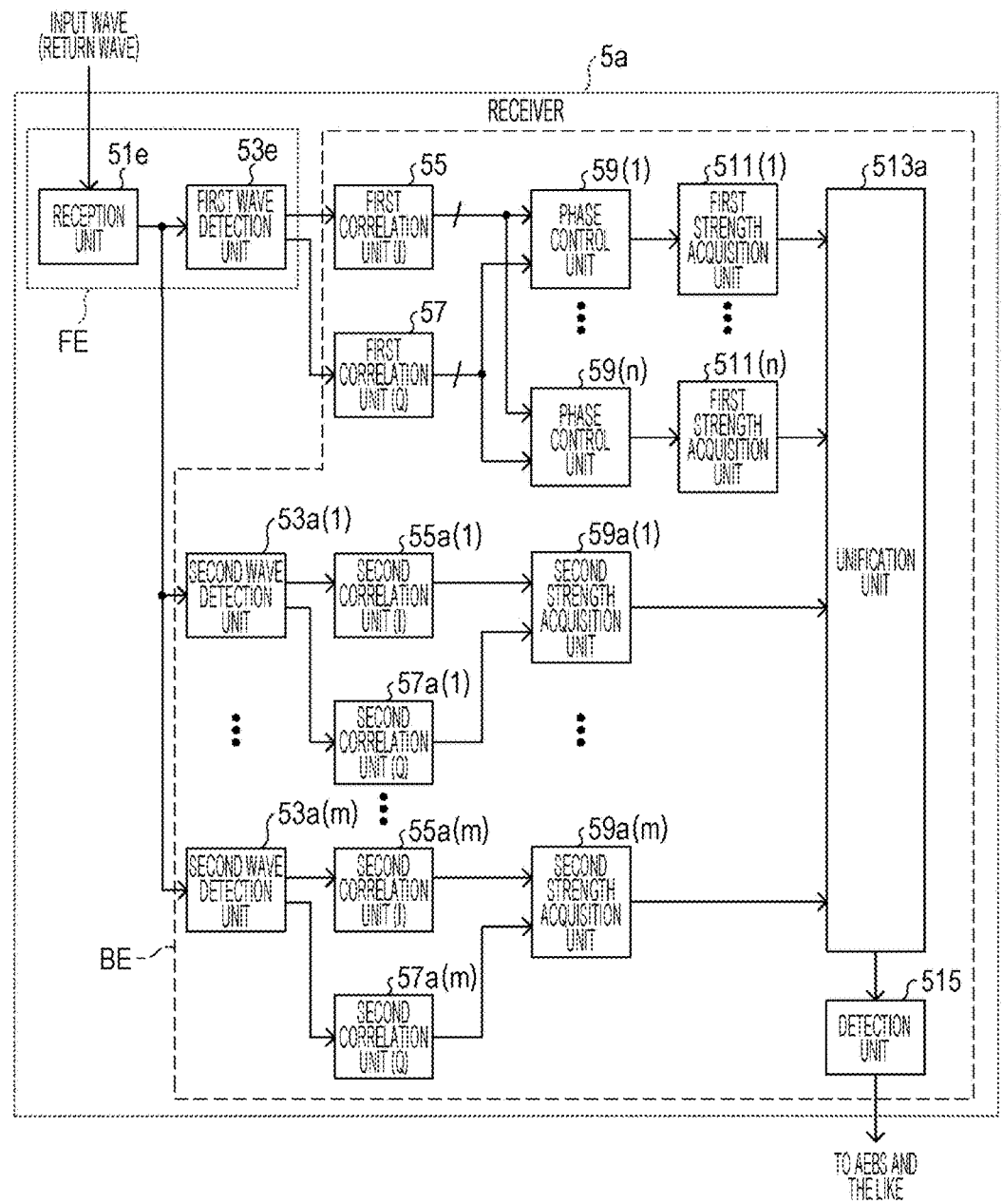
FIG. 9 is a diagram showing a configuration of a detection system according to a first modification.

In FIG. 9, the detection system 1a differs from the above-described detection system 1 in that the detection system 1a includes a receiver 5a instead of the receiver 5. The illustration of the transmitter 3e is omitted in FIG. 9.

The receiver 5a differs from the receiver 5 in that the receiver 5a further includes k sets of second wave detection units 53a(k) and, as an example of k sets of second correlation units, second correlation units (I) 55a(k) and second correlation units (Q) 57a(k). The receiver 5a also differs from the receiver 5 in that the control unit 58 thereof further includes k second strength acquisition units 59a(k) and that the receiver 5a includes a unification unit 513a instead of the unification unit 513. Here, k is a natural number from 1 to m. m is any integer greater than or equal to 2.

In FIG. 9, the components corresponding to those in the configuration in FIG. 5 are denoted by the same reference signs, and the descriptions thereof are omitted.

The first correlation unit (I) 55, the first correlation unit (Q) 57, and the n sets of phase control units 59(j), as well as the first strength acquisition units 511 (j) the second correlation units (I) 55a(k), the second correlation units (Q) 57a(k), and the unification unit 513a, as well as the detection unit 515 are inclusively called the back end BE. The components of the back end BE are integrated in the DSP of a chip, for example.

Figure 10:
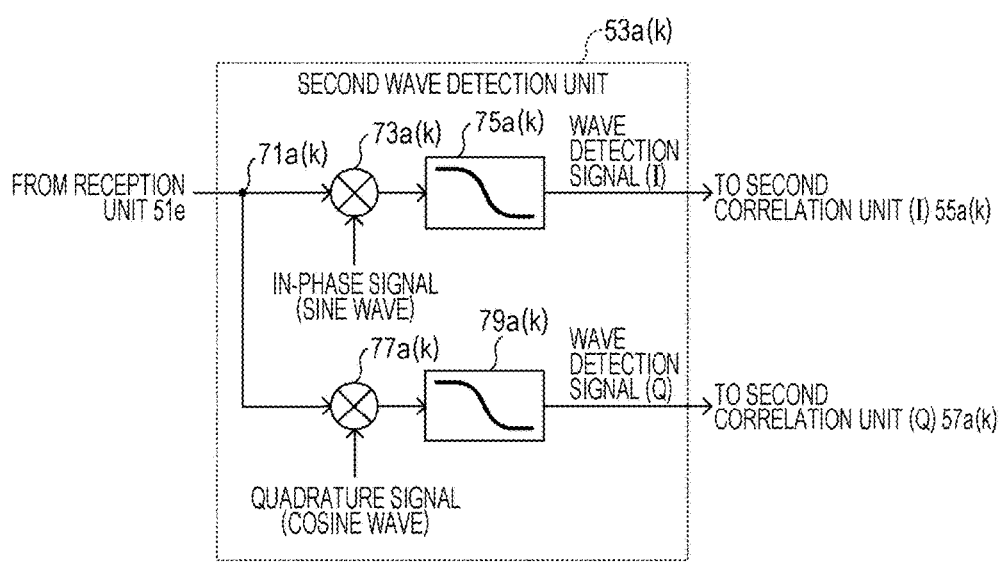
FIG. 10 is a diagram showing a configuration of a second wave detection unit in FIG. 9.

As shown in FIG. 10, each of the m second wave detection units 53a(k) includes a branch section 71a(k), a first mixer (I) 73a(k), a first LPF (I) 75a(k), a second mixer (Q) 77a(k), and a second LPF (Q) 79a(k) in order to perform the quadrature detection on the output wave from the reception unit 51e.

The branch section 71a(k), the first mixer (I) 73a(k), the first LPF (I) 75a(k), the second mixer (Q) 77a(k), and the second LPF (Q) 79a(k) have the same structure and function as the branch section 71e, the first mixer (I) 73e, the first LPF (I) 75e, the second mixer (Q) 77e, and the second LPF (Q) 79e in FIG. 3, respectively. The descriptions thereof are thus omitted.

However, the frequency of the in-phase signals inputted to the m first mixers (I) 73a(k) differ from each other by a determined value. Hence, also the frequency of the quadrature signals inputted to the m second mixers (Q) 77a(k) differ from each other by a determined value.

Each of the m second correlation units (I) 55a(k) can have the same structure and function as the first correlation unit (I) 55e in FIG. 1, and each of the m second correlation units (Q) 57a(k) can have the same structure and function as the first correlation unit (Q) 57e in FIG. 1. The descriptions thereof are thus omitted.

Each of the second strength acquisition units 59a(k) can have the same structure and function as the first strength acquisition unit 59e in FIG. 1. The descriptions thereof are thus omitted. Note that the strength information obtained by each second strength acquisition unit 59a(k) is outputted to the unification unit 513a.

(n+m) pieces of strength information are inputted to the unification unit 513a in every sampling cycle. The unification unit 513a selects one with the greatest value from the (n+m) pieces of strength information that are inputted in the same sampling cycle. The unification unit 513a outputs the selected strength information and index information, which indicates the strength acquisition units 511(j) and 59a(k) that output the selected strength information, to the detection unit 515.

As described above, in the present modification, the frequency of the in-phase signals inputted to the first mixers (I) 73a(k) differ from each other, and also the frequency of the quadrature signals inputted to the second mixers (Q) 77a(k) differ from each other. This leads any of the mixers 73a(k) to mix the frequency of the input wave, which is changed due to the Doppler shift, and the frequency of the in-phase signal, which is the same or similar to that of the input wave, and to generate the wave detection signal (I). Then, since one of the second correlation units (I) 55a(k) in the following stage of that mixer 73a(k) computes correlation of the generated wave detection signal (I) with the known code sequence, the second correlation unit (I) 55a(k) outputs the correlation signal (I) with the large correlation peak greater than or equal to the threshold. This point is also applicable to the corresponding second correlation unit (Q) 57a(k).

For example, when the carrier wave frequency fc is 56 kHz, the system including the second wave detection unit 53a(k), which mixes the frequency of the in-phase signal and the quadrature signal of 56 kHz, as well as the second correlation unit (I) 55a(k), the second correlation unit (Q) 57a(k), and the second strength acquisition unit 59a(k), which correspond to the second wave detection unit 53a(k), can detect the target T at a Doppler speed of 0 km/m.

Detecting the return wave from the target T that is coming toward the receiver 5a at 10 km/h needs the in-phase signal and the quadrature signal of 56.93 kHz to be allocated to the second wave detection unit 53a(k).

When the detection system 1a is used as the sonar device for vehicles and the carrier wave frequency fc is 56 kHz, the m second wave detection units 53a(k) may use the in-phase signal and the quadrature signal that change by 200 Hz within 54 kHz to 58 kHz. Note that m is 21 in this case.

The added value outputted from the phase control unit 59(j) is equivalent to approximated or simulated correlation signals (I) and (Q), which are obtained by detecting the input wave using the in-phase signal and the quadrature signal of the frequency of a combination of the carrier wave frequency fc and xHz, and by computing correlation with the detected result and the known code sequence. Note that the relatively large x causes the amount of phase rotation to be large and this makes it difficult for the phase control unit 59(j) to perform the phase control operation with high accuracy.

Hence, the phase control unit 59(j) approximates or simulates the correlation signals (I) and (Q), which are obtained by detecting the input wave using an in-phase signal and a quadrature signal that are relatively close to the carrier wave frequency fc and by computing correlation of the detected result with the known code sequence. In contrast, the second wave detection unit 53(k) may mix the frequency of the input wave using an in-phase signal and a quadrature signal that are relatively far from the carrier wave frequency fc.

Since large m affects the size of the circuit in the detection device 1a, n and m may be determined based on the size of the circuit, for example.

8. Operation and Effect of First Modification

According to the present modification, in addition to the operation and effect described in the fifth unit, the moving target T2 can be detected with high accuracy in a wide relative speed range as described above.

When the correlation signals (I) the number of which corresponds to the code sequence length are inputted, the n phase control units 59(j) generate the added values (I) which are obtained by rotating the phases of the inputted correlation signals (I) for the determined amount corresponding to the allocated frequency components and subsequently adding those phases.

Here, when the amount of phase rotation, which is occurred due to the Doppler shift in the code sequence of the input wave, is the same or similar to the amount of phase rotation allocated to one phase control unit 59(j) the added value (I) thereof shows the large correlation peak greater than or equal to the threshold. This point is also applicable to the added value (Q). The added values (I) and (Q) with the correlation peaks greater than or equal to the threshold are processed subsequently by the strength acquisition unit 511(j) the unification unit 513 and the detection unit 515, whereby the back end BE can improve accuracy of detecting the presence of the moving target T2.

9. Additional Description of First Modification

Note that the frequency of the return wave reflected from the moving target T2 is varied from the carrier wave frequency fc due to the Doppler effect. For example, the wavelength of the return wave is also varied from the wavelength of the carrier wave. The frequency of the return wave reflected from the moving target T2, which is coming toward the receiver 5a, becomes higher, and the wavelength thereof becomes shorter.

In order to conform the codes included in the wave detection signals (I) and (Q) with the number of the taps allocated to the codes when making correlation of the wave detection signals (I) and (Q) generated based on such a return wave, the numbers of the taps included in the second correlation unit (I) 55a(k) and the second correlation unit (Q) 57a(k) are set depending on the effect of elasticity, due to the Doppler shift, on the time axis of each code included in the wave detection signals (I) and (Q), for example.

For example, when the carrier wave frequency fc is 56 kHz, the second wave detection unit 53a(k) used for detecting the static target T1 detects the input wave using the in-phase signal and the quadrature signal of 56 kHz. In this case, in the second correlation unit (I) 55a(k) and the second correlation unit (Q) 57a(k) in the following stage, the number of taps y0 allocated to each code is determined based on the wavelength corresponding to the code and the sampling rate.

Next, the second wave detection unit 53a(k) which is used for detecting the moving target T2 coming toward the receiver 5a at 10 km/h, detects the input wave using the in-phase signal and the quadrature signal of 56.93 kHz. When the wavelength of the modulated wave is 1, the wavelength of the input wave is 0.9837. Hence, the wave is shortened by about 1.63% due to the Doppler effect, and the number of taps y1 allocated to each code in this case is 0.9837×y0.

Setting the numbers of taps to the second wave detection units 53a(k) in the same way allows the second correlation unit (I) 55a(k) and the second correlation unit (Q) 57a(k) to perform the correlation processing with high accuracy. Note that the setting of the numbers of taps is also applicable to the later-described second modification.

Here, Table 7 below exemplifies the numbers of taps allocated to the codes of the second correlation unit (I) 55a(k) and the second correlation unit (Q) 57a(k).

TABLE 7

Numbers of Taps Allocated to Codes of Correlation Units 55a(k) and 57a(k)

| | Frequency of In-phase Signal and Quadrature Signal of Wave Detection Unit 53a(k) | | | | |
|---|---|---|---|---|---|
| | 54.0 | ... | 56.0 | 56.2 | 56.4 | ... | 58.0 |
| Head Code | 12 | | 11 | 11 | 11 | | 11 |
| Second Code | 12 | | 11 | 12 | 12 | | 11 |
| Third Code | 11 | | 11 | 11 | 11 | | 11 |
| Fourth Code | 12 | | 11 | 11 | 11 | | 10 |
| Fifth Code | 11 | | 11 | 11 | 11 | | 11 |
| Sixth Code | 12 | | 11 | 11 | 11 | | 11 |
| Seventh Code | 11 | | 12 | 11 | 11 | | 11 |
| Eighth Code | 12 | | 11 | 11 | 11 | | 11 |
| Ninth Code | 12 | | 11 | 11 | 11 | | 10 |
| Tenth Code | 11 | | 11 | 12 | 11 | | 11 |
| Eleventh Code | 12 | | 11 | 11 | 11 | | 11 |
| Twelfth Code | 11 | | 11 | 11 | 11 | | 11 |
| Thirteenth Code | 12 | | 11 | 11 | 11 | | 10 |
| Fourteenth Code | 11 | | 12 | 11 | 12 | | 11 |
| Fifteenth Code | 12 | | 11 | 11 | 11 | | 11 |

In the above Table 7, for example, when the second wave detection unit 53a(k) detects the input wave at 56 kHz, the number of taps for the head code is 11 in the second correlation unit (I) 55a(k) and the second correlation unit (Q) 57a(k). In the case of such a number of taps with the carrier wave frequency fc at 56 kHz, one code is presented by 10 wavelengths. The time required for transmitting each code using the modulated wave is 178.5 μsec. Here, when the sampling rate in the second correlation unit (I) 55a(k) and the second correlation unit (Q) 57a(k) is 62.5 kHz (sampling cycle is 16 μsec), the numbers of taps y0, y1, y2, ... y14 for the head code, the second code, the third code, ... the fifteenth code are obtained as described below.

First of all, y0 is obtained by rounding off a value of 178.5×1/16 to the nearest whole number, and y0 is thus 11.

y1 is obtained by subtracting y0 from a value, which is obtained by rounding off a value of 178.5×2/16 to the nearest whole number, and y1 is thus 11.

y2 is obtained by subtracting the value, which is obtained by rounding off the value of 178.5×2/16 to the nearest whole number, from a value, which is obtained by rounding off a value of 178.5×3/16 to the nearest whole number, and y2 is thus 11.

In the same way, y14 is obtained by subtracting a value, which is obtained by rounding off a value of 178.5×14/16 to the nearest whole number, from a value, which is obtained by rounding off a value of 178.5×15/16 to the nearest whole number, and y14 is thus 11.

10. Second Modification

Next, a detection system 1b according to the second modification of the above-described embodiment is described with reference to FIG. 11.

In FIG. 11, the detection system 1b differs from the above-described detection system 1a in that the detection system 1b includes a receiver 5b instead of the receiver 5a. In FIG. 11, like the former case, the illustration of the transmitter 3e is omitted.

The receiver 5b differs from the receiver 5a in that the receiver 5b does not include the first wave detection unit 53e, the first correlation unit (I) 55, the first correlation unit (Q) 57, the n sets of phase control units 59(j), and the n sets of strength acquisition units 511 (j).

In FIG. 11, the components corresponding to those in the configuration in FIG. 9 are denoted by the same reference signs, and the descriptions thereof are omitted.

The second correlation unit (I) 55a(k), the second correlation unit (Q) 57a(k), the unification unit 513a and the detection unit 515 are inclusively called the back end BE. The components of the back end BE are integrated in the DSP of a chip, for example.

m pieces of the strength information are inputted to the unification unit 513a in every sampling cycle. The unification unit 513a selects one with the greatest value from the m pieces of the strength information that are inputted in the same sampling cycle. The unification unit 513a outputs the selected strength information and index information, which indicates the strength acquisition unit 59a(k) that outputs the selected strength information, to the detection unit 515.

As described above, in the present modification, the frequency of the in-phase signals inputted to the first mixers (I) 73a(k) differ from each other, and also the frequency of the quadrature signals inputted to the second mixers (Q) 77a(k) differ from each other. This may lead any of the mixers 73a(k) to mix the frequency of the input wave, which has the frequency changed due to the Doppler shift, and the in-phase signal, which has the frequency that is the same or similar to the input wave, and to generate the wave detection signal (I). In this case, the second correlation unit (I) 55a(k) in the following stage of the mixer 73a(k) computes correlation of the wave detection signal (I) with the known code sequence, thereby outputting the correlation signal (I) with the large correlation peak greater than or equal to the threshold. This point is also applicable to the corresponding second correlation unit (Q) 57a(k).

Conclusion of Embodiments

A detection device of the present disclosure includes: a first correlation circuit that computes correlation of a first wave detection signal which is a phase-modulated input wave detected at determined frequency with a determined code sequence for every code composing the determined code sequence, and to generate a plurality of first correlation signals the number of which corresponds to a code sequence length, which is a length of the determined code sequence; and a control circuit that rotates phases of the plurality of first correlation signals, generates an added value by adding the phase-rotated plurality of first correlation signals, and determines based on the added value whether the phase-modulated input wave is a return wave from a determined object.

The detection device of the present disclosure is a detection device in which: a first correlation circuit that computes correlation of a first wave detection signal which is a phase-modulated input wave detected at determined frequency with a determined code sequence for every code composing the determined code sequence, and to generate a plurality of first correlation signals the number of which corresponds to a code sequence length, which is a length of the determined code sequence; and a control circuit that rotates phases of the plurality of first correlation signals, generates an added value by adding the phase-rotated plurality of first correlation signals, and determines based on the added value whether the phase-modulated input wave is a return wave from a determined object.

The detection device of the present disclosure is a detection device in which: the phase-modulated input wave is generated by phase-modulating a carrier wave using the determined code sequence, and the determined frequency is frequency of the carrier wave.

The detection device of the present disclosure is a detection device in which the control circuit includes: a plurality of phase control circuits that rotate phases of the first correlation signals by determined amounts based on a plurality of different amounts of the Doppler shift, and generate added values by adding the phase-rotated first correlation signals, a plurality of first strength acquisition circuits that are provided corresponding to the plurality of phase control circuits, and, based on the added values generated by the corresponding phase control circuits, derive a plurality of pieces of first strength information indicating strength of the phase-modulated input wave, a unification circuit that selects one from the plurality of pieces of first strength information, and a detection circuit that determines whether the phase-modulated input wave is the return wave from the determined object.

The detection device of the present disclosure is a detection device in which: the determined amounts based on the amounts of the Doppler shift are any one of 0°, 90°, 180°, and 270°.

The detection device of the present disclosure is a single-chip integrated circuit.

The detection device of the present disclosure is a detection device further including: a second wave detection circuit that detects, by a signal of frequency different from that of a carrier wave, an input wave from outside and generates a second wave detection signal which detects the input wave and a second correlation circuit that computes correlation of the second wave detection signal with the determined code sequence for every code composing the code sequence to generate a single second correlation signal, wherein the control circuit includes a detection circuit that determines based on the added value and the second correlation signal whether a determined object is present within a detection area of the detection device.

A detection method of the present disclosure includes: computing correlation of a first wave detection signal, which is a phase-modulated input wave detected at determined frequency, with a determined code sequence for every code composing the determined code sequence, and thus generating a plurality of first correlation signals the number of which corresponds to a code sequence length, which is a length of the determined code sequence; and rotating phases of the plurality of first correlation signals, generating an added value by adding the phase-rotated plurality of first correlation signals, and determining based on the added value whether the phase-modulated input wave is a return wave from a determined object.

A non-transitory computer-readable recording medium storing a detection program of the present disclosure includes: computing correlation of a first wave detection signal, which is a phase-modulated input wave detected at determined frequency, with a determined code sequence for every code composing the code sequence, and thus generating a plurality of first correlation signals the number of which corresponds to a code sequence length, which is a length of the determined code sequence; and rotating phases of the plurality of first correlation signals, generating an added value by adding the phase-rotated plurality of first correlation signals, and determining based on the added value whether the phase-modulated input wave is a return wave from a determined object.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

A detection device, a detection method, and a non-transitory computer-readable recording medium storing a detection program according to the present disclosure can improve accuracy of detecting a moving target and, for example, is applicable to a sonar for vehicles.

What is claimed is:

1. A detection device, comprising:
a first correlation circuit that computes correlation of a first wave detection signal which is a phase-modulated input wave detected at a determined frequency with a determined code sequence for every code composing the determined code sequence, and generates a plurality of first correlation signals the number of which corresponds to a code sequence length, which is a length of the determined code sequence; and
a control circuit that rotates phases of the plurality of first correlation signals, generates an added value by adding the phase-rotated plurality of first correlation signals, and determines based on the added value whether the phase-modulated input wave is a return wave from a determined object, wherein:
the first wave detection signal includes an I signal component and a Q signal component, which are obtained by performing quadrature detection on the phase-modulated input wave,
the first correlation circuit computes correlation of the I signal component of the first wave detection signal and the Q signal component of the first wave detection signal with the determined code sequence for every code composing the determined code sequence, and generates an I signal component of the plurality of first correlation signals and a Q signal component of the plurality of first correlation signals, and
the control circuit includes a phase rotation control circuit which rotates phases of the I signal component of the plurality of first correlation signals and a phase rotation control circuit which rotates phases of the Q signal component of the plurality of first correlation signals, generates an I signal component of the added value by adding the I signal component of the phase-rotated plurality of first correlation signals and a Q component signal of the added value by adding the Q signal component of the phase-rotated plurality of first correlation signals, and the control circuit determines based on the I signal component of the added value and the Q signal component of the added value whether the phase-modulated input wave is the return wave from the determined object.

2. The detection device according to claim 1, wherein:
the phase-modulated input wave is generated by phase-modulating a carrier wave using the determined code sequence, and
the determined frequency is a frequency of the carrier wave.

3. The detection device according to claim 1, which is a single-chip integrated circuit.

4. A detection device comprising:
a first correlation circuit that computes correlation of a first wave detection signal which is a phase-modulated input wave detected at a determined frequency with a determined code sequence for every code composing the determined code sequence, and generates a plurality of first correlation signals the number of which corresponds to a code sequence length, which is a length of the determined code sequence; and
a control circuit that rotates phases of the plurality of first correlation signals, generates an added value by adding the phase-rotated plurality of first correlation signals, and determines based on the added value whether the phase-modulated input wave is a return wave from a determined object,
wherein the control circuit includes:
a plurality of phase control circuits that rotate phases of the first correlation signals by determined amounts based on a plurality of different amounts of a Doppler shift, and generate added values by adding the phase-rotated first correlation signals,
a plurality of first strength acquisition circuits that are provided corresponding to the plurality of phase control circuits, and, based on the added values generated by the corresponding phase control circuits, derive a plurality of pieces of first strength information indicating strength of the phase-modulated input wave,
a unification circuit that selects one from the plurality of pieces of first strength information, and
a detection circuit that determines whether the phase-modulated input wave is the return wave from the determined object.

5. The detection device according to claim 4, wherein the determined amounts based on the amounts of the Doppler shift are any one of 0°, 90°, 180°, or 270°.

6. A detection device comprising:
a first correlation circuit that computes correlation of a first wave detection signal which is a phase-modulated input wave detected at a determined frequency with a determined code sequence for every code composing the determined code sequence, and generates a plurality of first correlation signals the number of which corresponds to a code sequence length, which is a length of the determined code sequence;
a control circuit that rotates phases of the plurality of first correlation signals, generates an added value by adding the phase-rotated plurality of first correlation signals, and determines based on the added value whether the phase-modulated input wave is a return wave from a determined object;

a second wave detection circuit that detects, by a signal of a frequency different from that of a carrier wave, an input wave from outside of the detection device and generates a second wave detection signal which detects the input wave; and a second correlation circuit that computes correlation of the second wave detection signal with the determined code sequence for every code composing the code sequence and generates a single second correlation signal, wherein the control circuit includes a detection circuit that determines based on the added value and the second correlation signal whether the determined object is present within a detection area of the detection device.

7. A detection method performed by a detection device, comprising:

computing, by the detection device, correlation of a first wave detection signal, which is a phase-modulated input wave detected at a determined frequency, with a determined code sequence for every code composing the determined code sequence;

generating, by the detection device, a plurality of first correlation signals the number of which corresponds to a code sequence length, which is a length of the determined code sequence;

rotating, by the detection device, phases of the plurality of first correlation signals;

generating, by the detection device, an added value by adding the phase-rotated plurality of first correlation signals; and determining, by the detection device, based on the added value whether the phase-modulated input wave is a return wave from a determined object, wherein:

the first wave detection signal includes an I signal component and a Q signal component, which are obtained by performing quadrature detection on the phase-modulated input wave, the computing of the correlation of the first wave detection signal includes computing correlation of the I signal component of the first wave detection signal and the Q signal component of the first wave detection signal with the determined code sequence for every code composing the determined code sequence, and generating an I signal component of the plurality of first correlation signals and a Q signal component of the plurality of first correlation signals, the rotating of the phases of the plurality of first correlation signals includes rotating phases of the I signal component of the plurality of first correlation signals and rotating phases of the Q signal component of the plurality of first correlation signals, and generating an I signal component of the added value by adding the I signal component of the phase-rotated plurality of first correlation signals and a Q component signal of the added value by adding the Q signal component of the phase-rotated plurality of first correlation signals, and the determining of whether the phase-modulated input wave is the return wave from the determined object includes determining based on the I signal component of the added value and the Q signal component of the added value whether the phase-modulated input wave is the return wave from the determined object.

8. The detection method according to claim 7, wherein:
the phase-modulated input wave is generated by phase-modulating a carrier wave using the determined code sequence, and the determined frequency is a frequency of the carrier wave.

9. The detection method according to claim 7, comprising:

rotating, by the detection device, phases of the first correlation signals by determined amounts based on a plurality of different amounts of a Doppler shift;

generating added values by adding the phase-rotated first correlation signals, deriving a plurality of pieces of first strength information indicating strength of the phase-modulated input wave, based on the generated added values;

selecting one from the plurality of pieces of first strength information; and determining whether the phase-modulated input wave is the return wave from the determined object.

10. The detection method according to claim 9, wherein the determined amounts based on the amounts of the Doppler shift are any one of 0°, 90°, 180°, or 270°.

11. The detection method according to claim 7, further comprising:

detecting, by the detection device, an input wave from outside of the detection device, by a signal of a frequency different from that of a carrier wave;

generating, by the detection device, a second wave detection signal which detects the input wave;

computing, by the detection device, correlation of the second wave detection signal with the determined code sequence for every code composing the code sequence;

generating, by the detection device, a single second correlation signal; and determining, by the detection device, based on the added value and the second correlation signal whether the determined object is present within a detection area of the detection device.

12. A non-transitory computer-readable recording medium storing a detection program that, when executed, causes a detection device to:

compute correlation of a first wave detection signal, which is a phase-modulated input wave detected at a determined frequency, with a determined code sequence for every code composing the code sequence, and generate a plurality of first correlation signals the number of which corresponds to a code sequence length, which is a length of the determined code sequence; and rotate phases of the plurality of first correlation signals, generate an added value by adding the phase-rotated plurality of first correlation signals, and determine based on the added value whether the phase-modulated input wave is a return wave from a determined object, wherein:

the first wave detection signal includes an I signal component and a Q signal component, which are obtained by performing quadrature detection on the phase-modulated input wave, the detection program causes the detection device to compute correlation of the first wave detection signal by causing the detection device to compute correlation of the I signal component of the first wave detection signal and the Q signal component of the first wave detection signal with the determined code sequence for every code composing the determined code sequence, and generate an I signal component of the plurality of first correlation signals and a Q signal component of the plurality of first correlation signals, the detection program causes the detection device to rotate phases of the plurality of first correlation signals by causing the detection device to rotate phases of the I signal component of the plurality of first correlation signals and rotate phases of the Q signal component of the plurality of first correlation signals, and to generate an I signal component of the added value by adding the I signal component of the phase-rotated plurality of first correlation signals and a Q component signal of the added value by adding the Q signal component of the phase-rotated plurality of first correlation signals, and the detection program causes the detection device to determine whether the phase-modulated input wave is the return wave from the determined object by causing the detection device to determine based on the I signal component of the added value and the Q signal component of the added value whether the phase-modulated input wave is the return wave from the determined object.

13. The computer-readable recording medium according to claim 12, wherein:

the phase-modulated input wave is generated by phase-modulating a carrier wave using the determined code sequence, and the determined frequency is a frequency of the carrier wave.

14. The computer-readable recording medium according to claim 12, the detection program, when executed by the processor, causes the detection device to:

rotate phases of the first correlation signals by determined amounts based on a plurality of different amounts of a Doppler shift, generate added values by adding the phase-rotated first correlation signals, derive a plurality of pieces of first strength information indicating strength of the phase-modulated input wave, based on the generated added values, select one from the plurality of pieces of first strength information, and determine whether the phase-modulated input wave is the return wave from the determined object.

15. The computer-readable recording medium according to claim 14, wherein the determined amounts based on the amounts of the Doppler shift are any one of 0°, 90°, 180°, or 270°.

16. The computer-readable recording medium according to claim 12, the detection program, when executed by the processor, causes the detection device to:

detect, by a signal of a frequency different from that of a carrier wave, an input wave from outside of the detection device and generate a second wave detection signal which detects the input wave; and compute correlation of the second wave detection signal with the determined code sequence for every code composing the code sequence and generate a single second correlation signal; and determine based on the added value and the second correlation signal whether the determined object is present within a detection area of the detection device.

* * * * *